US012450363B2

(12) United States Patent
Ohayon et al.

(10) Patent No.: US 12,450,363 B2
(45) Date of Patent: Oct. 21, 2025

(54) DEVICE, SYSTEM, AND METHOD FOR PROTECTING MACHINE LEARNING (ML) UNITS, ARTIFICIAL INTELLIGENCE (AI) UNITS, LARGE LANGUAGE MODEL (LLM) UNITS, AND DEEP LEARNING (DL) UNITS

(71) Applicant: DEEPKEEP LTD., Tel Aviv (IL)

(72) Inventors: Rony Ohayon, Rehovot (IL); Jonathan Wagner, Rehovot (IL)

(73) Assignee: DEEPKEEP LTD., Tel Aviv (IL)

( * ) Notice: Subject to any disclaimer, the term of this patent is extended or adjusted under 35 U.S.C. 154(b) by 65 days.

(21) Appl. No.: 18/381,260

(22) Filed: Oct. 18, 2023

(65) Prior Publication Data

US 2024/0054233 A1   Feb. 15, 2024

Related U.S. Application Data

(63) Continuation-in-part of application No. PCT/IL2022/050397, filed on Apr. 14, 2022.

(60) Provisional application No. 63/176,375, filed on Apr. 19, 2021.

(51) Int. Cl.
*G06F 21/00* (2013.01)
*G06F 21/54* (2013.01)
*G06F 21/56* (2013.01)
*G06F 21/57* (2013.01)

(52) U.S. Cl.
CPC ............ *G06F 21/577* (2013.01); *G06F 21/54* (2013.01); *G06F 21/566* (2013.01)

(58) Field of Classification Search
None
See application file for complete search history.

(56) References Cited

U.S. PATENT DOCUMENTS

| | | |
|---|---|---|
| 2019/0050564 A1 | 2/2019 | Pogorelik |
| 2019/0188562 A1 | 6/2019 | Edwards |
| 2020/0143045 A1 | 5/2020 | Joye |
| 2020/0167471 A1* | 5/2020 | Rouhani ............. G06N 7/01 |
| 2020/0410399 A1* | 12/2020 | Lang ..................... G06N 5/01 |

(Continued)

OTHER PUBLICATIONS

International Search Report in PCT/IL2022/050397, dated Jul. 27, 2022.

(Continued)

*Primary Examiner* — Andrew J Steinle
(74) *Attorney, Agent, or Firm* — AlphaPatent Associates Ltd.; Daniel J. Swirsky

(57) ABSTRACT

Systems and methods for protecting machine learning engines, artificial intelligence engines, large language models, and deep learning engines. An Offline Protection Unit is configured to analyze one or more characteristics of a Protected Engine, and to perform offline fortification of the Protected Engine against attacks by changing operational properties or operational parameters of the Protected Engine to reduce its vulnerability to attacks. An Online Protection Unit is configured to perform analysis of at least one of: (i) inputs that are directed to be inputs of the Protected Engine, (ii) outputs that are generated by the Protected Engine; and based on the analysis, to dynamically perform online fortification of the Protected Engine against attacks by dynamically changing operational properties or operational parameters of the Protected Engine to reduce its vulnerability to attacks.

30 Claims, 4 Drawing Sheets

(56) References Cited

U.S. PATENT DOCUMENTS

2021/0073376 A1    3/2021   Tran
2021/0110045 A1*   4/2021   Buesser ................. G06N 3/045

OTHER PUBLICATIONS

Written Opinion of the International Searching Authority in PCT/IL2022/050397, dated Jul. 27, 2022.
Aleksander Madry et al., "Towards Deep Learning Models Resistant to Adversarial Attacks", dated Jun. 19, 2017. Available at: arxiv.org/pdf/1706.06083v1.
Communication from the European Patent Office in patent application EP 22791260.7, dated Jan. 31, 2025.
Communication from the European Patent Office in patent application EP 22791260.7, dated Sep. 12, 2025.

\* cited by examiner

DEVICE, SYSTEM, AND METHOD FOR PROTECTING MACHINE LEARNING (ML) UNITS, ARTIFICIAL INTELLIGENCE (AI) UNITS, LARGE LANGUAGE MODEL (LLM) UNITS, AND DEEP LEARNING (DL) UNITS

CROSS-REFERENCE TO RELATED APPLICATIONS

This patent application is a Continuation-in-Part (CIP) of PCT international application number PCT/IL2022/050397, having an international filing date of Apr. 14, 2022, which is hereby incorporated by reference in its entirety; which claims priority and benefit from U.S. 63/176,375, filed on Apr. 19, 2021, which is hereby incorporated by reference in its entirety.

FIELD

Some embodiments relate to the field of electronic systems

BACKGROUND

Millions of people use electronic devices on a daily basis, such as, desktop computers, laptop computers, smartphones, tablets, or the like. Electronic devices are used for a variety of tasks; for example, to perform online purchases and transactions, to watch movies and consume digital content, to send and receive electronic mail (email) messages, to engage in online chat or Instant Messaging (IM), to participate in audio conferences or video conferences, to play games, or the like.

Some computer servers or applications may utilize Machine Learning (ML), Deep Learning (DL), Artificial Intelligence (AI), and other techniques, in order to analyze data and to generate analysis results or insights.

SUMMARY

Some embodiments include devices and methods for protecting Machine Learning (ML) units or engines, Artificial Intelligence (AI) units or engines, Large Language Model (LLM) units or engines, and/or Deep Learning (DL) units or engines, as well as units or engines that perform Reinforcement Learning (RL) or Supervised Learning (SL), generative units or engines that are able to generate text and/or audio and/or speech and/or images and/or videos and/or other types of data, and/or units or engines that utilize a Neural Network (NN), units or engines that perform National Language Processing (NLP) and/or computer vision, and/or multi-modal units or engines, and/or units or engines that perform various other AI/ML/DL/LLM-based tasks; as well as transformer-based engines, and LLM engines or units (e.g., similar to Generative Pre-training Transformer (GPT) or GPT-4 or other/future versions of GPT from OpenAI or from other providers, or Llama from Meta or other providers, or Bard from GOOGLE® or other providers), including (but not limited to) conversational generative AI bots or chat-bots or chat-based AI tools that are able to perform various AI-based operations (e.g., AI-based conversing with a user, answering questions, summarizing content, researching topics, solving problems and inquiries, and otherwise generating content in response to a prompt or a set of prompts which may include text and/or data and/or audio and/or images and/or video), and including multi-modal engines that can interact with (or process) a plurality of different types of data or prompts (e.g., a combination of text and/or numerical data and/or images and/or video and/or audio), transformer based models, diffusion based models, or the like.

Systems and methods for protecting machine learning engines, artificial intelligence engines, and deep learning engines. An Offline Protection Unit is configured to analyze one or more characteristics of a Protected Engine, and to perform offline fortification of the Protected Engine against attacks by changing operational properties or operational parameters of the Protected Engine to reduce its vulnerability to attacks. An Online Protection Unit is configured to perform analysis of at least one of: (i) inputs that are directed to be inputs of the Protected Engine, (ii) outputs that are generated by the Protected Engine; and based on the analysis, to dynamically perform online fortification of the Protected Engine against attacks by dynamically changing operational properties or operational parameters of the Protected Engine to reduce its vulnerability to attacks.

Some embodiments may provide additional and/or other benefits and/or advantages.

DETAILED DESCRIPTION OF SOME DEMONSTRATIVE EMBODIMENTS

Figure 1:
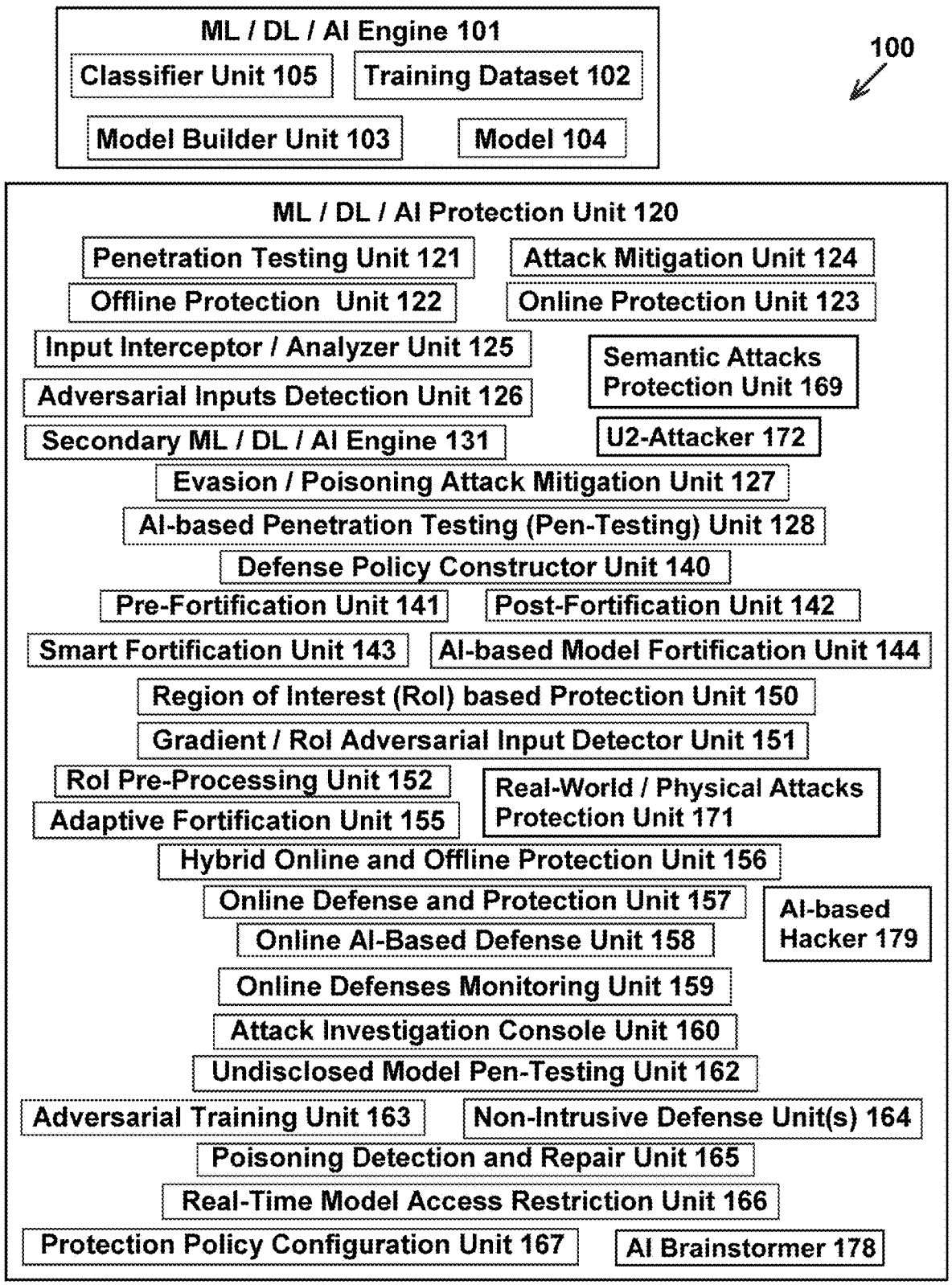
FIG. 1 is a schematic block-diagram illustration of a system and its components, in accordance with some demonstrative embodiments.

The Applicants have realized that various electronic systems and information processing systems utilize Machine Learning (ML) units or analysis engines, Deep Learning (DL) units or analysis engines, and/or Artificial Intelligence (AI) units or analysis engines, in order to analyze or process data and to generate outputs (e.g., results, predictions, estimates, determination results, conclusions, insights, correlations, recommendations, actions (e.g., for robotic systems), textual output, numeric output, image output, video output, audio output, speech output, animation output, interactive output, chat-based output, a combination or a set of two or more outputted data-types, or the like). Such ML/DL/AI units are sometimes utilized to accomplish a task for which no fully deterministic and satisfactory algorithm is available.

The Applicants have realized that some ML/DL/AI systems may be subject to attacks or cyber-attacks or compromise attempts, by adversaries or competitors or hackers or third-parties. Some embodiments may provide devices and methods for protecting ML/DL/AI systems against such attacks, or for mitigating or curing such attacks, or for curing or reversing or decreasing or isolating the damage caused (or attempted) by such attacks.

For example, the Applicants have realized that some ML/DL/AI systems may be subject to an Evasion Attack, or an Adversarial Examples Attack. In such attack, for example, data that is fed to the ML/DL/AI system includes "adversarial examples"; input that should include only correct images of Cats, may now include (I) an image of a dog that is labeled as a cat, or (II) and image of a cat that was manipulated by adding to it "noise" or minuscule details that make the image still appear to be a cat in human eyes but that throws-off or confuses a classifier unit. In some situations, realized the Applicants, even a careful tampering with only few pixels in a digital image, may cause confusion and wrong classification at an ML/DL/AI system. The Applicants have realized that in such Evasion Attacks, the attacker does not attempt to penetrate into the ML/DL/AI system or to modify its manner of operation; but rather, the Evasion Attack injects or feeds or introduces to the ML/DL/AI system incorrect data, or incorrectly-classified data, or machine-confusing data, or data augmented with digital "noise" or addendums, or entirely incorrect data, or partially-incorrect data, or partially-replaced data, or data that was otherwise tampered with or manipulated, eventually causing the ML/DL/AI system to generate output that is different than what was expected by the designer of the ML/DL/AI system. The Applicants have also realized that such Evasion Attacks are not limited to image analysis or computer vision systems, and/or that the attack does not necessarily make the system run different code, but attempts to make the ML/DL/AI system perform a different task than the tasks that the operator or administrator or provider of the ML/DL/AI system had authorized or allowed or configured or intended, such as in reprogramming attacks or jailbreak attacks in which the attacker attempts to make an LLM generate textual output with forbidden or off-limits or unauthorized words or with regard to forbidden or off-limits or unauthorized topics, or such as image/video generative engines that an attacker may cause to generate visual outputs that are defined as forbidden or off-limits or unauthorized; and/or other Evasion Attacks that may similarly be initiated against voice recognition/generative systems, text analysis/generative systems, video analysis/recognition/generative systems, image analysis/recognition/generative systems, audio analysis/recognition/generative systems, tabular data analysis/generative systems, LIDAR analysis systems, signal analysis/generative systems, timer series analysis systems, malware detection systems, financial systems and Fin-Tech systems (e.g., electronic loan issuance system, electronic mortgage issuance system, electronic credit card issuance system, electronic bank account opening system, electronic brokerage account or securities account opening system), ML/DL/AI systems that utilize (or, that operate on) real time or near-real-time data or data-items or data-streams (e.g., a live or near-live or real-time or near-real-time video stream, or video frames stream, or stock quotes stream, or securities transactions streams; an automated trading system; an automated vehicular driving system, and autonomous vehicular driving system, an Advanced Drive-Assistance System (ADAS), an automated industrial system that performs monitoring or sensing and analysis of data), a "black box" type of ML/DL/AI unit (e.g., that performs therein one or more ML/DL/AI tasks based on an input signal and that generates an output signal, such as a hardware component of a vehicle that performs ML/DL/AI tasks), and/or other systems.

The Applicants have also realized that some ML/DL/AI systems may be subject to a Stealing Attack, including a Model stealing attack and/or a Dataset stealing attack. For example, an adversary or a competitor may perform model extraction or model reconstruction or model imitation based on outputs generated by the ML/DL/AI system; or may leverage or improve the capabilities or the efficiency or the accuracy of the attacker's ML/DL/AI system (e.g., which trained on a public dataset) by utilizing or leveraging outputs from a competitor's ML/DL/AI system (e.g., which trained on a proprietary or private dataset); or may generate inferences (e.g., including extraction of personal data or private data) about data that is utilized by a ML/DL/AI system based on inquiries sent to that ML/DL/AI system and analysis of the outputs generated by that ML/DL/AI system.

The Applicants have further realized that some ML/DL/AI systems may be subject to a Reprogramming Attack. For example, the attacker leverages or abuses his ability to send queries to an existing ML/DL/AI system and to receive outputs from it, in order to achieve a new task that was not intended to be achieved (or facilitated) by the owner of the ML/DL/AI system. For example, an object detection ML/DL/AI system may be used or abused by an attacker to actually perform Optical Character Recognition (OCR) of texts; an image recognition ML/DL/AI system may be used or abused by an attacker to actually generate medical diagnosis results from images of people; or the like.

The Applicants have further realized that some ML/DL/AI systems may be subject to a Poisoning Attack. For example, the attacker performs Corruption Poisoning, by injecting to the training dataset a small or relatively small number of carefully-selected malicious examples, which may significantly damage or corrupt the operational accuracy of the ML/DL/AI system. In another example, the attacker performs Backdoor Poisoning, by injecting to the training dataset a small number of carefully-selected malicious examples that include a secret code or indicia, causing the ML/DL/AI system to generally operate as intended when encountering regular inputs, but also causing that ML/DL/AI system to classify a special type of input (which includes a similar secret code or indicia) in accordance with the attacker's intent when such input is fed to the ML/DL/AI system. The Applicants have realized that a Poisoning Attack may attempt to modify the operation of an ML/DL/AI system to operate in a particular manner that is desired by the attacker, in general or in response to a particular subsequent query or type of query; by injecting or introducing into the training dataset one or more malicious training data items (e.g., injecting a relatively small number of malicious data-items into the training dataset, compared to the large size of the entire training dataset). In some situations, such Poisoning Attack may be performed in real time or in near-real-time, or as a one-time event or as a periodic set of events; and may be performed directly towards the AI engine or AI system, and/or may be performed indirectly towards one or more units that collect data and periodically update or add data that an AI engine uses; including (for example) a recommender system or other AI-based systems.

The Applicants have realized that there is a need to protect ML/DL/AI systems against such attacks, as well as against other types of attacks or compromise attempts.

Reference is made to FIG. 1, which is a schematic block-diagram illustration of a system 100, in accordance with some demonstrative embodiments. System 100 may comprise an ML/DL/AI Engine 101, which is the unit (or sub-system, or system, or computer, or server, or set of computerized modules) that is being protected against attacks or abuse or malicious activity. The ML/DL/AI Engine 101 may also be referred to herein as "the protected ML/DL/AI Engine 101", or "the ML/DL/AI Engine 101 being protected or evaluated".

The ML/DL/AI Engine 101 may comprise or may use, for example: a Training Dataset 102 which is a large dataset of examples or labeled examples or already-classified examples; a Model Builder Unit 103 which constructs and/or updates a Model 104; a Classifier Unit 105 (or a feature-izer or featurizer, or labeler unit); and additional units or components, for example, an Evaluator unit, a Performance Monitor unit, a Ground Truth Collector unit, an Orchestrator unit that controls and commands other units, a Model Server optionally associated with an Application Programming Interface (API) to enable efficient reception of inputs and generation of outputs, a Front-End unit to provide metrics and to generate textual clarifications for numerical results, or the like).

In accordance with some embodiments, an ML/DL/AI Protection Unit 120 may protect the ML/DL/AI Engine 101 from or against cyber-attacks or attempts to compromise its operation, or from one or more particular attacks against such ML/DL/AI systems. For example, the ML/DL/AI Protection Unit 120, or one or more of its components or units or sub-systems (e.g., the Online Protection Unit 123, and/or other components of the ML/DL/AI Protection Unit 120) may be implemented using modular architecture which allows scalability and may provide a cloud service for multiple users, or may be installed locally as a licensed software component; or may be installed locally or on a network as a dedicated hybrid hardware and software unit; or may be operating as a "firewall device for ML/DL/AI engines", which may be, for example, a locally-installed "firewall device for ML/DL/AI engines", or a co-located "firewall device for ML/DL/AI engines", or a server-based "firewall device for ML/DL/AI engines", or a cloud-computing based "firewall device for ML/DL/AI engines", or a dedicated local or remote or cloud-based machine or unit which operates as a "firewall device for ML/DL/AI engines", or as a software unit which may be purchased or licensed, or as a hybrid hardware-and-software unit, or using other suitable deployment or configuration schemes. It is further noted that the above-mentioned implementation schemes and/or architecture may be utilized, in some embodiments, for implementing the entirety of the ML/DL/AI Protection Unit 120, or a particular component of ML/DL/AI Protection Unit 120, or a particular subset or group of components of ML/DL/AI Protection Unit 120.

The ML/DL/AI Protection Unit 120 may comprise, for example: a Penetration Testing Unit 121, configured to automatically or semi-automatically test or evaluate the robustness of the ML/DL/AI Engine 101 against different threats; an Offline Protection Unit 122, which operates to modify the structure and/or operation of the ML/DL/AI Engine 101 in order to enhance its security and resilience against attacks; an Online Protection Unit 123, which may perform one or more defensive services that protect the ML/DL/AI Engine 101 in real time or near real time.

In some embodiments, the Offline Protection Unit 122 may implement offline defense techniques for protecting the ML/DL/AI Engine 101. The Applicants have realized that some the ML/DL/AI Engines may assume an offline setting, such that the the ML/DL/AI pipeline is fortified or secured during its development stage, and the resulting secure pipeline is then deployed and becomes available for receiving and processing incoming queries or inputs. In contrast to this approach, realized the Applicants, an online fortification technique operates to apply defenses to the ML/DL/AI Engine 101 online, by an external component or unit that has an interface to the AI pipeline in deployment, or that is otherwise operably associated with the ML/DL/AI Engine 101, or that is configured to operate as a gateway or as a filter or as a monitoring unit for incoming queries.

The Applicants have further realized that the online defense techniques in accordance with some embodiments may provide various advantages; for example, it may allow dynamic and/or modular application of defense techniques, it may allow easier and/or faster integration of defense techniques, it may enable protection of "black box" pipelines, and/or it may allow better separation between the development of security measures and the development of the ML/DL/AI functionality, and/or by providing online or cloud-based or remote protection systems or protection layers (e.g., remote or cloud-based detector units) which are non-intrusive and do not modify (and/or do not interfere with the regular operation of) the original ML/DL/AI model which the user (namely, the owner or operator or administrator or developer of the ML/DL/AI system) spent efforts and resources to construct and to fine-tune.

The Applicants have also realized that "offline protection", such as via the Offline Protection Unit 122, may provide additional and/or other benefits or advantages. In accordance with some embodiments, "offline protection" of the ML/DL/AI Engine 101 may include, for example, receiving or analyzing or accessing the ML/DL/AI Engine 101 prior to its deployment, and performing one or more operations and/or modifications and/or additions in order to upgrade or secure or fortify the ML/DL/AI Engine 101 against attacks; and generating or returning an updated or upgraded or augmented version of the ML/DL/AI Engine 101, which is more secure or more fortified or more resilient than the original version thereof, and which can then be utilized and deployed.

In some embodiments, the Offline Protection Unit 122 may perform (or may be utilized for performing) one or more of the following protection and fortification techniques: (A) Dataset fortification, dataset "hardening", dataset augmentation, pre-processing operations, data sanitization operations, data pruning operations; (B) Architecture fortification or architecture "hardening", such as, by modifying the structure and/or architecture of Neural Networks (or other AI/ML/DL algorithms), by modifying the structure and/or architecture of the AI/ML/DL Pipeline, by replacing or removing or insecure elements (e.g., a Deep Neural Network (DNN) or other component) with a secure version or a more secure version thereof; (C) System parameters modification, for example, based on re-training, adversarial training, threshold modification, modification or introduction of threshold values, modification or introduction of operational conditions; (D) Architecture Augmentation, for example, by creation of ensembles of models, adding or modifying pre-processing elements or components, adding post-processing elements or components; (E) Adding attack detectors to the AI/ML/DL Pipeline, which may generate a notification or raise a flag or throw an exception when an input (or, a series or set of inputs) are identified as malicious or are estimated or determined to be malicious; (F) Other suitable techniques. In some embodiments, the protection system or platform may actively add Attack Detector(s) to the pipeline that the Protected Engine is part of, and/or may construct such a pipeline by adding Attack Detector(s) to a stand-alone Protected Engine; and/or by adding or invoking online Attack Detectors and/or offline Attack detectors; and/or by adding or invoking Attack Detectors that are stateless or that do not necessarily (or at all) maintain state (e.g., they analyze or classify each input signal by itself, ignoring previously-received or subsequently-received input signals); and/or by adding or invoking Attack Detectors that are stateful or that maintain state (e.g., they analyze or classify each input signal not only by itself, but also in relation to or in combination with one or more previously-received and/or subsequently-received input signals, thereby predicting or analyzing over a multiple-inputs set or series).

In some embodiments, at least some of the offline protection operations are performed automatically or semi-automatically by the Offline Protection Unit 122. For example, the Offline Protection Unit 122 may automatically analyze the structure and/or operations of the ML/DL/AI Engine 101; may automatically detect that the ML/DL/AI Engine 101 lacks a particular type of pre-processing component or post-processing component; and may automatically or semi-automatically (e.g., subject to an approval from a human administrator) augment the ML/DL/AI Engine 101 with the missing component(s). Similarly, the Offline Protection Unit 122 may automatically analyze the structure and/or operations of the ML/DL/AI Engine 101; may automatically detect that the ML/DL/AI Engine 101 lacks a particular filtering mechanism (e.g., a rate-limiting component or filter, that limits the number or the frequency of incoming queries from a particular sender); and may add or introduce such component or filter. In some embodiments, the protection operation(s) and/or the mitigation operation (s) may be dynamically selected by the protection platform, based on a set of rules for such operations selection, and/or based on the estimated or quantified severity of an estimated problem or an estimated attack, and/or based on the resources and protection techniques that are relevant and are available for protecting this particular ML/DL/AI engine of this particular system.

For example, the protection platform or its Offline Protection Unit 122 may submit 500 rapid queries within 1 second to the protected ML/DL/AI engine, and may observe that the ML/DL/AI engine struggles to generate timely output (e.g., within N milliseconds of each input signal, on average), and may thus deduce that the ML/DL/AI engine most probably lacks or does not apply a Rate-Limiting Pre-Processing filter or gate or mechanism, or that such Rate-Limiting module may exist but is improperly configured; and the protection platform may thus automatically recommend to add such Pre-Processing unit or module, and in some implementations may automatically add such pre-processing module or unit automatically or semi-automatically.

Similarly, the protection platform may detect that output signals that are generated by the ML/DL/AI engine suffer from anomalies or inconsistencies which may be attributed to lack or (or mis-configuration of) a post-processing unit or module, such as lack of (or mis-configuration of) a pruning routine, a rule filtering scheme, a knowledge integration scheme, a module for shrinking or pruning or truncating a decision tree or decision rules or association rules or classification rules, and/or other post-processing filters that attempt to remove or filter-out "noisy" or imprecise outputs.

Similarly, the Offline Protection Unit 122 may automatically detect that the ML/DL/AI Engine 101 utilizes a particular condition or threshold value that causes the ML/DL/AI Engine 101 to be more prone or less resilient to attacks; and may automatically increase or decrease or modify such threshold value, or may automatically modify or cancel or augment the condition, based on pre-defined list of rules for performing such modifications if a particular set of parameters or thresholds or conditions is detected. Other suitable techniques may be used.

The ML/DL/AI Protection Unit 120 may further comprise, optionally, an Attack Mitigation Unit 124, which may be a separate unit from the above-mentioned units, or may be integrated with one or more of the above-mentioned unit, or may operate in conjunction with one or more of the above-mentioned units, or may be comprised within one or more of the above-mentioned units, or may comprise therein one or more of the above-mentioned units. For example, the Attack Mitigation Unit 124 may collect or receive inputs or insights from one or more of the other units 121-123, and/or may fuse together such inputs to generate additional insights, and may trigger or initiate or execute one or more mitigation operations in order to decrease or eliminate or stop or reduce or pause a particular damage or abuse or fraudulent use or adversarial use of the ML/DL/AI Engine 101. Such mitigation operations may include, for example: blocking or quarantining or discarding some (or most, or all) of the incoming traffic or queries or requests that are determined by the ML/DL/AI Protection Unit 120 to be of a malicious nature or to originate from an adversarial entity; blocking or quarantining or discarding some (or most, or all) of the outgoing traffic or results or insights or outputs that were supposed to be outgoing to an entity that is determined by the ML/DL/AI Protection Unit 120 to be to be outgoing to an entity that of a malicious nature or to originate from an adversarial entity; significantly slowing down the rate or speed of processing requests or queries of such adversarial entity, and/or the rate or speed of sending back results or outputs to such adversarial entity; modifying and/or manipulating outputs and/or query results prior to sending them to such adversarial entity, or (in some implementations) even intentionally sending out false results or incorrect results or opposite results or modified results, or random or pseudo-random results, to such adversarial entity; pruning or diluting or purging or cleaning-up a training set or a training dataset or an examples dataset, that was or that is utilized by the ML/DL/AI Engine 101, such as by removing or deleting or excluding or discarding one or more examples or data-points or data-items that are determined to be of adversarial nature, replacing or correcting or re-labeling or re-classifying one or more training examples or training data-points, optionally by utilizing a human classifier and/or by utilizing another computerized service or another ML/DL/AI Engine to re-classify or to re-label particularly only such data-points; re-performing a training session and/or re-building of the ML/DL/AI model based on the updated or pruned or purged or diluted dataset; generating a notification or warning message or alert message, indicating abuse or the ML/DL/AI Engine 101, and sending or transmitting such message to one or more pre-defined parties (e.g., an administrator entity of the ML/DL/AI Engine 101; a law enforcement agency) and/or to one or more dynamically-defined parties (e.g., to a contact address of the entity that is determined to be a malicious entity or an adversarial entity; to an Internet Service Provider (ISP) of such adversarial entity; to a domain registrar of such adversarial entity; to a server hosting facility of such adversarial entity). In some embodiments, in addition to or instead of dataset manipulations and/or re-training, other protection and mitigation methods may be applied; for example, architecture modification (e.g., replacing and/or adding and/or removing and/or quarantining elements or sub-units of the protected ML/DL/AI Engine 101; or modifying one or more operational parameters thereof); replacing a current version of the protected ML/DL/AI Engine 101 with a previous or prior version thereof (e.g., obtained from a versioning unit or repository that stores previous versions of the protected ML/DL/AI Engine 101); modifying or updating or replacing a defense policy or a protection policy that enables the user (e.g., the administrator or owner of the ML/DL/AI Engine 101) to configure and to balance the system's requirements or operational parameters or operational constraints, such as by automatically switching from operating in accordance with a first pre-defined protection policy to operating in accordance with a second, different, pre-defined protection policy (e.g., out of a pool or bank or array of pre-defined protection policies); or the like.

In some embodiments, the ML/DL/AI Protection Unit 120 may utilize a semi-automatic and/or semi-supervised process for attack detection, attack mitigation, and protection. The ML/DL/AI Protection Unit 120 operates to achieve accurate classification of inputs that are fed into the into the ML/DL/AI Engine 101, as either (I) legitimate inputs (e.g., non-adversarial; genuine; non-attack-related), or (II) non-legitimate or illegitimate inputs (e.g., adversarial inputs, attack-related inputs, compromising inputs, malicious inputs, fraudulent inputs, attacking inputs, abusing or abusive inputs).

In a demonstrative example, the ML/DL/AI Engine 101 is configured to perform image classification of vehicular license plate number (or strings) that appear in photos or images. When an input (e.g., an image with a license plate in it) is received at an entry point of the ML/DL/AI Engine 101, or immediately prior to that entry point, the ML/DL/AI Protection Unit 120 utilizes an Input Interceptor/Analyzer Unit 125 that intercepts the incoming image and applies to it an automatic attack-detection algorithm that are configured to operate in a strict manner to reduce false positive errors, such that if the output of the attack-detection algorithm is that the image is not malicious then the image is indeed not attack-related. Since the algorithm is strict, it does have some percentage of false positives (e.g., determining that a particular photo is malicious or attack-related, while in fact it is not). In order to remedy this, when an input is detected as attack-related, such input is then routed automatically to a computing terminal for manual human inspection by a human labeler or a human classifier. If the identification of the photo content by the human labeler is the same as the original identification by the ML/DL/AI Protection Unit 120, then the attack determination is considered an error and such error is ignored or discarded (and/or is stored in a side repository for additional learning and in order to enable the ML/DL/AI Protection Unit 120 to learn from such errors and to improve the system). In contrast, if the identification of the photo content by the human labeler is different from the original identification produced by the ML/DL/AI Engine 101, then this input (e.g., this photo) is considered malicious or adversarial or part of an attack against the ML/DL/AI Engine 101, and is marked or reported as such, and the true label or the correct label as set by the human labeler is utilized as the correct output.

In some embodiments, optionally, instead of using a human labeler (or human classifier), or in addition to it, the ML/DL/AI Engine 101 that is being protected against attacks (or against malicious inputs or adversarial inputs) may utilize a secondary (e.g., proprietary, or publicly available) similar ML/DL/AI Engine, or a plurality of such secondary ML/DL/AI Engines, solely for the purpose of detecting such malicious input(s). For example, Company A is developing and/or operating its own ML/DL/AI Engine 101, which is tailored to correctly classify detect objects in photos that pertain specifically to animals. Company A receives or obtains a particular photo, "Tiger.jpg", which is pre-labeled or pre-classified as a tiger. Instead of automatically relying on such pre-label or pre-classification, the ML/DL/AI Protection Unit 120 (which protects the ML/DL/AI Engine 101) sends that particular photo to a third-party classification service and/or to a public classification service, which does not necessarily specializes in this field (animals); such as, to the "reverse image search" engine of GOOGLE® or BING® (or to both of them); and such "secondary" engine indicates that the photo "Tiger.jpg" is actually classified by it as a "sofa" or "couch" (e.g., it actually depicts a sofa having a fabric that is patterned like a tiger skin). Based on the classification by such "secondary" engine, or by a majority of such secondary engines, or by at least one of such secondary engines, the ML/DL/AI Engine 101 that is being protected may determine that the photo "Tiger.jpg" should not be relied upon as a tiger animal, and/or should be discarded or deleted, or should be classified as "sofa", or should be otherwise treated or handled as a malicious input or as adversarial input. Such inquiry towards the "secondary" ML/DL/AI Engine(s) may be performed by a Guarding Unit or a Filtering Unit of the system, or by an Adversarial Inputs Detection Unit 126, which may guard the ML/DL/AI Engine 101 against malicious inputs and may prevent such malicious input from even entering or reaching the ML/DL/AI Engine 101 itself, by using a human labeler, a Secondary ML/DL/AI Engine 131, a set of secondary ML/DL/AI Engines, and/or other methods. Some embodiments may optionally utilize a mechanism that applies a "wisdom of the crowd" technique, in which each one of a plurality of Secondary ML/DL/AI Engines (and optionally, one or more human labelers) is queried for its output or for its result with regard to a particular incoming query (that is incoming to the protected ML/DL/AI Engine 101), and the dominant result or the majority result or the most frequent result (or, a result that is an output of a weighted formula, that allocated different weights to different Secondary ML/DL/AI Engines based on their reputation or trustworthiness or size or speed or other parameters) prevails and is utilized as the "ground truth".

In some embodiments, an Evasion/Poisoning Attack Mitigation Unit 127 may be configured to mitigate or cure an evasion attack or a poisoning attack towards the ML/DL/AI Engine 101. The unit reflects a "backup" operation plan, that is triggered upon detection of such attack(s), and particularly upon detection of an ongoing attack that cannot necessarily be immediately blocked. Evasion/Poisoning Attack Mitigation Unit 127 may have the following functionalities and/or features: (A) Manual Classification Backup Service is Set-Up in a dedicated center, ready to be operative within a short notice (e.g., 15 or 30 or 60 minutes, based on the requirements of the owner of the ML/DL/AI Engine 101 that is being protected); (B) the system detects that the ML/DL/AI Engine 101 is currently being attacked, resulting in incorrect classifications by the ML/DL/AI Engine 101 with regard to all, or at least N percent of, input queries (e.g., N being a pre-defined threshold value, such as 50 or 33 or 25 or other value), or, by utilizing a threshold value or a condition that is based on the percentage of inputs that were determined or estimated to be adversarial (e.g., inputs that belong to, or are associated with, an attack), since detecting an adversarial input may (in some implementations) be easier or more efficient or more accurate than detecting an incorrectly classified input; (C) the attack is identified or suspected, by one or more protection mechanisms, or by other system metrics, system user reports, or other sources (e.g., a detection that an abnormal or excessive number of inputs are received per minute or per hour, or that numerous inputs are incoming from a particular source or entity, or other indicators of a possible attack); (D) the attack mitigation unit is initiated or triggered, switching to manual (e.g., human) classification service that is set up rapidly with multiple human labelers that are familiar with the particular ML/DL/AI task at hand, and routing or re-routing incoming queries to the manual classification service instead of the ML/DL/AI Engine 101; then, (E) once the attack is blocked or ends, the manual mitigation service is stopped, and queries are again routed to the original and automated ML/DL/AI Engine 101.

Some embodiments may protect the ML/DL/AI engine against Semantic Attacks. While adversarial attacks often include attempts to "fool" or "trick" the ML/DL/AI model based on mathematical manipulations (e.g., carefully crafted patches or textures, or otherwise specific digital manipulation of an image), Semantic Attacks attempt to "fool" or "trick" the ML/DL/AI model by using low-tech methods, such as visual manipulations (e.g., Spoofing Attacks in which a poster is displayed, or an image is projected and tricks the model to identify non-existent objects). These attacks may impose a serious threat to vision-based or visual models, as they pose an easy-to-create yet hard to-protect physical attacks (e.g., an army of soldiers using carpets depicting a river which cause a rival autonomous system to incorrectly recognize the landscape). Other types of semantic attacks include exploiting weak spots of the model; for example, if the model does not work well when there is fog, the attacker can use smoke to avoid being recognized by the model. Another option is malicious Out of Distribution (OoD), which creates an anomalous instance that is not from the distribution the model was trained on; such as using unusual colors/unique costumes/funny hat/irregular textures and/or abnormal artifacts, that cause the model to operate incorrectly or to output incorrect results. The system may protect against Semantic Attacks via a Semantic Attacks Protection Unit 169 by performing, for example: (a) characterization of the attack surface of practical/semantic attacks against DL/ML/AI engines, and particularly against such engines for autonomous computer-vision systems or object-recognition systems; (b) generating and/or simulating and/or emulating such attacks; (c) detecting fingerprints of such attacks, and/or characteristics or features that indicate that such attack is ongoing or is attempted, in order to provide a protection layer or a solution for protecting against such attacks; (d) providing a particular protection against OoD attacks, for example, based on confidence intervals or confidence levels/scores that are attributed or achieved for each component or region in an image; (e) providing a particular protection against Spoofing attacks based on detection of particular indicators of such attacks; (f) fortification of an existing ML/DL/AI system or model, optionally with re-training based on data augmentation.

Some embodiments may use a Real-World/Physical Attacks Protection Unit 171 to protect the ML/DL/AI engine against Physical Attacks or real-world based attacks or non-digital attacks; such as, an attack that is performed by modifying real-world/non-digital data prior to its transformation into digital data that is provided as an input or a query or a prompt to the ML/DL/AI engine. For example, in a digital attack, pixels in a digital image are modified on a computer, in order to "trick" the ML/DL/AI engine (e.g., tricking the engine to classify a dog as a wolf). In contrast, a physical/real-world/non-digital attack performs one or more real-world/non-digital modifications to the environment; such attacks can be tedious and effort consuming to perform (e.g., it is almost impossible to color the entire sky in green, in the real world), yet such attacks can be difficult to detect if indeed performed. A physical attack may involve, for example, utilization of abnormal or misleading angles to capture a photograph, such as in a way that causes objects to appear disproportionally large or small; placement of an extremely-large object (or conversely, an extremely-small object) in a particular setting or among other regular-sized objects in order to confuse the model; taking advantage of unusual or rare weather conditions or real-world coincidences (e.g., abnormal color of sky at sunset or sunrise, or abnormal shape or color of the sun during a solar eclipse); utilization of real-world objects that cause an observer to experience an optical illusion; and/or other physical attacks.

Figure 3:
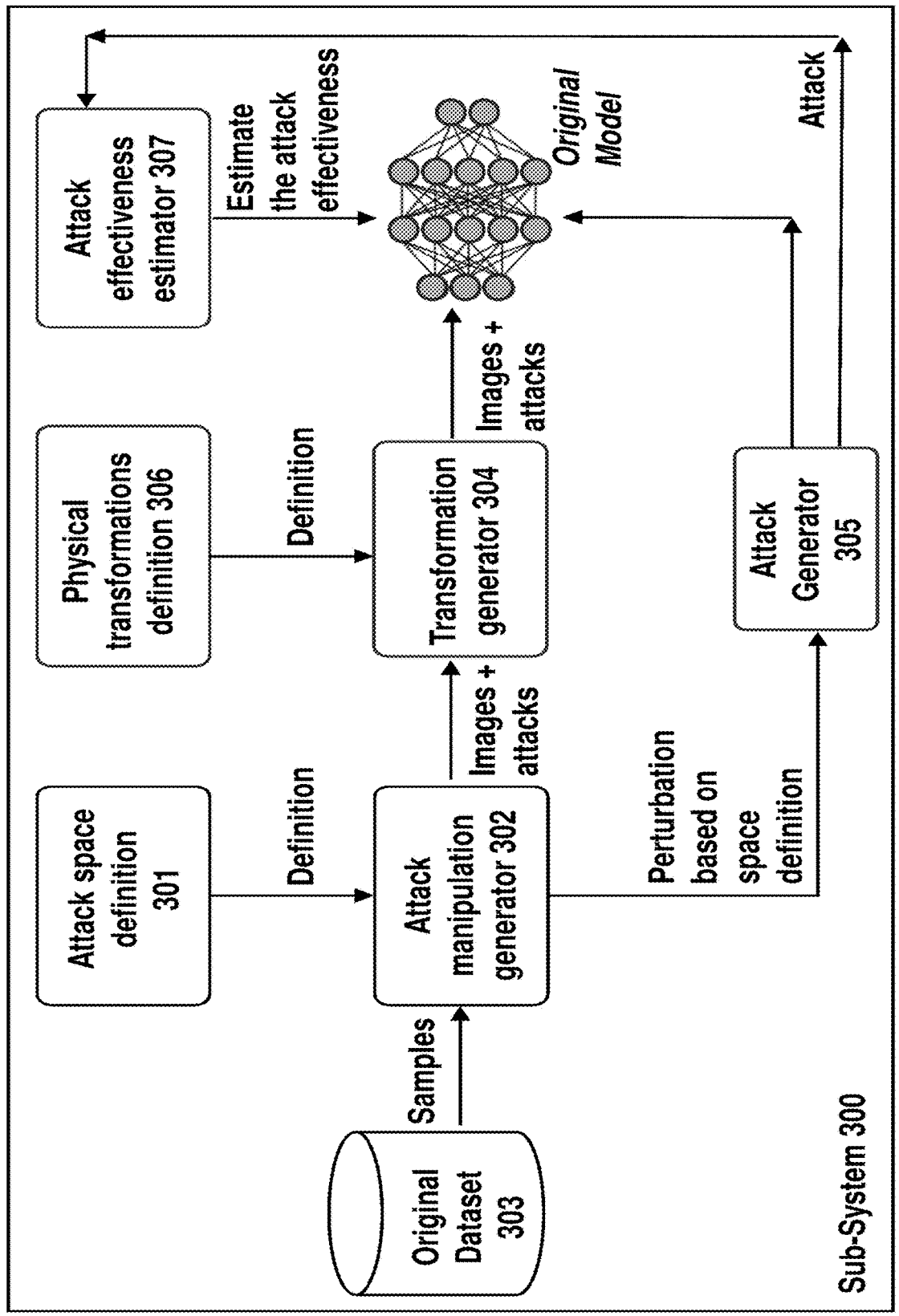
FIG. 3 is a schematic block-diagram illustration of a sub-system for Real-World/Physical Attacks Protection of ML/DL/AI engines, in accordance with some demonstrative embodiments.

Reference is made to FIG. 3, which is a schematic block-diagram illustration of a sub-system 300 for Real-World/Physical Attacks Protection of ML/DL/AI engines, in accordance with some demonstrative embodiments; which may be a demonstrative implementation of the above-mentioned Real-World/Physical Attacks Protection Unit 171. For example, an Attack Space Definition Unit 301 provides or defines the attack space, and provides the definition of the attack space to an Attack Manipulation Generator Unit 302 that also receives samples from the original dataset 303. The Attack Manipulation Generator Unit 302 generates attack parameters, and provides attack parameters perturbations (based on the attack space definition) to an Attack Generator Unit 305. The attack parameters are also provided, with images, to a Transformation Generator 304, which further receives physical transformation definitions that were generated by a Physical Transformations Definition Unit 306. The Transformation Generator 304 provides the images and the attack parameters to the original ML/DL/AI model; and the Attack Generator 305 further provides the attack to the original ML/DL/AI model and also to an Attack Effectiveness Estimator 307 that estimates the effectiveness of the particular attack that was performed towards the original ML/DL/AI model.

Turning again to FIG. 1, the system may include a "U2-Attacker" module, or a Universal "Universal Attacker" module 172, which may create new attacks (against the ML/DL/AI engine) using an LLM-based attack generator. For example, LLM capabilities are used to achieve semantic automation scalability of adversarial attacks (and/or other features), allowing automatic customization of attacks to particular domains and/or to particular AI tasks. For example, given a specified domain by the user (e.g., an example of an AI task "Style Transfer in Images" can be, "Given an image, modify it to be in a different style such as Van Gogh"), in the first stage the possible attack goals are generated automatically by an LLM (e.g., make the style transfer to do anything, or make the style transfer always convert the image to noise, or the like), whereas in the second stage an LLM is used to automatically create a script of code (e.g., Python code) of the objective function that is suitable for a given attack objective. Following this, the generated code is inserted into the U2Attacker framework, thus creating a full attack code base that carries out the different attacks. Finally, LLMs and AI engines can be used to automatically generate testing code for the created attack and/or for code verification.

In some embodiments, the system may include an AI Brainstormer module 178, in which a set or array of interconnected LLMs is utilized and allowed to communicate with each other. The interaction is set up such that each LLM has different goals to achieve, and communication is partial such that not all LLMs participate in all conversation segments, resulting in different histories of each LLM. Optionally, a one LLM may be configured to operate as a moderator towards the other LLMs, and/or to assign text-generation roles to particular LLMs at different time-points or conversation-points, and/or to assign listening roles to particular LLMs and/or to determine which portions of the chat history would be accessible to which LLM(s). In some embodiments, an AI Brainstormer may be configured to prompt one or some or all of the participating LLMs to focus on one or more aspects of security/reliability/accuracy/efficiency of the MuT; for example, a first LLM may be configured/prompted to generate insights or outputs about accuracy of the MuT, whereas a second LLM may be configured/prompted to generate insights or outputs about the efficiency of the MuT, whereas a third LLM may be configured/prompted to generate insights or outputs about the resilience of the MuT against a particular type of attacks, and so forth; and outputs from a particular LLM may be accessible to one or more other particular LLMs, as pre-defined in a configuration and/or as determined dynamically by the Moderator LLM.

Some embodiments may utilize semantic automation for scalability and enhancement of security of the MuT; such as, via generalization of the U2-Attacker. While the U2-attacker is an example of semantic automation of attack creation using LLMs, a generalization of this is semantic automation of all elements of the protection platform, including model and dataset handling, and all the other features including defenses, detectors, mitigation mechanisms, UI, or the like. Another example of this is the weak-spot detection feature described herein, or the automation of tabular data digestion: In general, tabular data AI tasks are domain dependent, such that the constraints on table values, and table value relations, typically depend on the specific context (for example, the value of age has strong relationship to the value of number of children; the number of children can rarely be 15 when the age is 21). This information is useful for crafting attacks, but in order to know this there is a need for semantic understanding which LLMs can provide automatically.

For example, an AI-based Hacker Module 179 may be used, as an agent-based module that autonomously develops attacks, automatically, as a hacking research team would have done, acting as an automatic AI-based hacker. It may perform: (a) collecting and analyzing information from different sources (Internet, public sources, private repository); (b) Implementing algorithmic ideas (transforming the idea to code); (c) obtaining/modifying/deploying external code; (d) automatic investigation and analysis of phenomena, or automatic root cause analysis, determining the reasons for the phenomena, as demonstrated in the weak-spots feature discussed herein; (e) Creating new ideas or new features for algorithms (as partially demonstrated in the U2 Attacker, and using other insights such as those provided by the AI Brainstormer module); (f) Developing new algorithms, as a meta-feature that can be achieved by performing multiple cycles of creating new attacks and analyzing the results as described, and/or by applying reinforcement learning or search algorithms of hyper parameters of the other protection units/protection processes. In some embodiments, these functionalities may be improved or boosted using meta algorithms; for example: (i) creating multiple AI-based hackers that are competing against each other, or even trying to attack each other, or are configured to play a simulated game of attackers against defenders; (ii) Applying RL on the system; (iii) Allowing the AI-based hacker to teach itself new capabilities; (iv) Performing evolutional optimization on the skills required by the AI-based hacker.

In some embodiments, the protection system may include a Weak Spots Analysis Unit 173, configured to uncover hidden attributes within images (or other data) that impact the model's performance (e.g., degrading the model's accuracy) that may not be detected using other methods. The weak spot analysis pinpoints new features or patterns that were not yet previously recognized, yet play a role in the model's performance. These areas where the model struggles are referred to as "weak spots". By detecting these weak spots, the system can attain a more profound understanding of the underlying reasons for the model's shortcomings and develop approaches to enhance its performance. To carry out a weak spot analysis, the system may evaluate the model's performance in various circumstances, such as with diverse input data or under shifting environmental conditions. Additionally, examining the model's performance across different classes or categories and comparing them can help in identifying inconsistencies. This process allows to uncover systematic errors that may be adversely affecting the model's overall performance. Error analysis is employed to identify weak spots, by examining the model's incorrect predictions and analyzing emerging patterns or trends. For instance, it may be discovered that the model consistently misclassifies specific types of inputs, or is more susceptible to errors under certain environmental conditions. By detecting these patterns, targeted solutions can be generated to address them.

In a demonstrative example, the system detected image features that were identified as significant contributors to a model's reduced performance in object recognition: (a) Night clusters with numerous streetlights work worse than ones at night without streetlights; (b) the Model under Test (MuT) performs optimally during daylight hours, and when there are no obstructing vehicles in its field of view (which may prevent it from detecting certain parts of other cars); (c) the MuT exhibits poor performance in identifying jeeps and other large vehicles; (d) the MuT can recognize medium distance objects fairly well, but it is not accurate at determining their location; (e) Compared to other cars, the model is more adept at recognizing cabs/taxis; (f) The primary reason for misses is due to the distance of the objects; (g) The clusters with the poorest performance are not during nighttime, but rather when the road is very clear and the cars (if any) are very far away.

Figure 4:
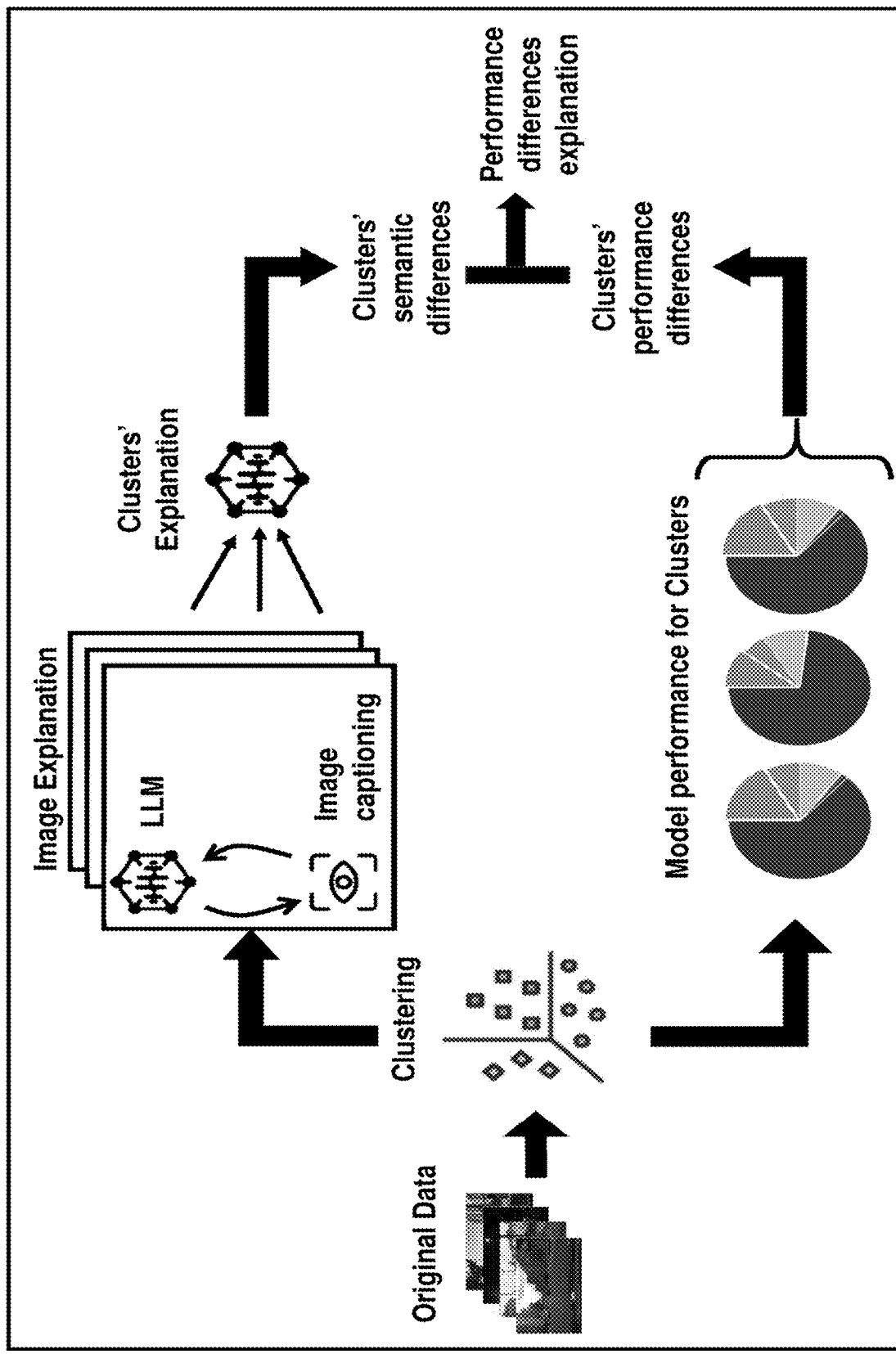
FIG. 4 is a schematic diagram demonstrating a process for finding weak spots of an ML/DL/AI engine or model, in accordance with some demonstrative embodiments.

To list the hidden features that contribute to the model's overall performance, a method for extracting the underlying features from a collection of images is used. Reference is made to FIG. 4, which is a schematic diagram demonstrating a process 400 for finding weak spots of an ML/DL/AI model, in accordance with some embodiments.

The initial step of the process involves dataset clustering, which groups together similar images based on specific criteria such as visual similarity or object categories. The clustering enables separate analysis and evaluation of the model's performance on different data subsets. By identifying clusters of images with similar features, insights can be gained into the specific characteristics of those data subsets, allowing for the development of targeted strategies and operations to enhance the model's performance Clustering is performed on the latent spaces. For example, two large clusters separate the images into night and daytime. All the images within each cluster are generally similar to each other and possess unique characteristics or at least one common characteristics. Once the clusters are separated and are ready, the next step is to analyze the performance of the MuT on each one of the clusters separately.

Error analysis includes separately evaluating the model's performance within each cluster, by detecting and analyzing the mistakes it makes. Investigating the nature of errors occurring in each cluster enables the system to understand the attributes of the specific subset. For example, the system may discover that the model persistently misclassifies images of particular animals, or repeatedly struggles with recognizing objects in images captured in low light conditions. However, in order to make these kinds of observations, the system firstly examines the performance for each cluster.

In parallel, image and cluster explanations are performed. With the clusters and their performance established, the system automatically extracts the semantic content of the images. This step involves using a combination of an image captioning model and a language model (such as an LLM, and/or a computer vision algorithm) to generate detailed textual description of each image's contents/objects/environment. By randomly sampling or other selecting images (e.g., based on particular selection rules; such as, select N images having 1080p resolution, select M images having 720 resolution, select K images having 480p resolution, or other suitable selection rules) from each cluster and processing them through this pipeline, a list of comprehensive image descriptions for each cluster can be produced. These descriptions may include object categories, color palettes, visual textures, and/or other visual features that can be described in words of a natural language by the LLM or other language model. The description is generated by utilizing an automatic conversation or chat session between the LLM and the image captioning model.

Then, by examining and analyzing all the image descriptions generated by the LLM for a specific cluster, features common to all images can be identified, providing a semantic understanding of what makes that particular cluster unique.

The following is an example of an automatic conversation between the LLM or Language Model (denoted LM) and the Image Captioner (denoted as IC). The language model aims to obtain the most detailed description possible for the image. The LM is configured to ask the IC a maximum of N questions (e.g., up to 15 or 20 questions) before providing its best textual estimate of the image's content.

LM: Question 1: What is the main subject of the image?
IC: The truck
LM: Question 2: What type of truck is it?
IC: It's a semi truck
LM: Question 3: What color is the semi truck?
IC: It's a white truck
LM: Question 4: What is the background of the image?
IC: The background of the image is a city street at night
LM: Question 5: Are there any people visible in the image?
IC: No, there are no people visible in the image
LM: Question 6: Are there any other vehicles in the image besides the semi truck?
IC: Yes, a grey van.
LM: Question 7: Are there any significant landmarks or buildings in the image?
IC: No
LM: Question 8: Is the semi truck in motion or parked?
IC: It's in motion
LM: Question 9: What is the weather like in the image?
IC: The image is taken at night, and the weather is clear and sunny.
LM: Question 10: Please clarify the weather in the image, as the previous answer was contradictory.
IC: The image is from the night, and the weather was clear and sunny.
LM: Question 11: Please provide accurate information about the weather in the image since it is a nighttime scene.
IC: The image is a nighttime scene. The weather is clear and sunny.
LM: Question 12: Is there any visible damage or abnormal features on the semi truck?
IC: No, the truck is in good condition
LM: Question 13: Are there any street signs, traffic lights, or other indicators in the image?
IC: No
LM: Question 14: Is the truck carrying any cargo or pulling a trailer? If so, please describe it.
IC: The truck is carrying.
LM: Question 15: Are there any distinctive markings, logos, or text on the semi truck?
IC: No Based on the above automatic conversation between the LM and the IC, the LM can generate the following estimation/evaluation of semantic information regarding the visual content that is depicted in the image: "The image features a white semi truck as its main subject. The truck is in motion on a city street at night with a clear and starry sky. No people are visible in the image, but there is another grey van. The semi truck has a cargo attached and is in good condition with no visible damage, logos, or markings. The background is free of any significant landmarks, street signs, or traffic lights".

Applying same or similar conversations as above, enables to generate and gather semantic information for each image within the same cluster. Then, a subsequent step automatically finds the common features that appear in all or the majority of those images of the cluster.

The LM can thus generate a textual list of features that are shared across the images in a cluster. The following is an example showcasing the features of one of the clusters generated by the LM.

Feature 1: Cars as the primary subject: Most of the descriptions involve a car or vehicle as the central focus in the image.
Feature 2: Nighttime setting: A majority of the image descriptions mention the scene taking place at night.
Feature 3: Rainy weather: Many of the descriptions involve rain or wet streets.
Feature 4: Urban environment: A significant number of images are set in cities, specifically New York City or London.
Feature 5: No significant actions or activities: Most descriptions mention that there are no notable actions or objects held by people, or no direct engagement of the car with other elements in the scene.
Feature 6: Presence of landmarks: Several descriptions include recognizable landmarks in the background, such as the New York Public Library, the Statue of Liberty, the Brooklyn Bridge, the Empire State Building, or the clock tower in London.
Feature 7: Absence of traffic signals, signs, or distinctive markings: Many descriptions note the lack of street signs, traffic signals, or other recognizable markings on vehicles or in the environment.

Then, cluster comparison is performed. For example, after identifying the features at the cluster level, these features are employed to compare clusters that exhibit semantic similarity but differ in their performance characteristics. By detecting the disparities in features between these clusters, specific features that contribute to performance differences can be isolated. For instance, it may be found that images in one cluster generally have more intricate backgrounds or increased occlusions, which could be contributing to the model's inferior performance on that particular cluster.

The following is an example of a comparison between the features of two clusters. In this comparison, one of the features has been identified as the likely cause for the discrepancy in performance between the two clusters, and it has been added to the weak spot feature list. Upon examining the two sets of images, it has been confirmed that the noted comparisons indeed distinguish the two clusters and indeed indicate a weak spot of the model.

Feature 1: Presence of streetlights: cluster 1—Many of the images feature streetlights illuminating the scene; cluster 2—No mention of streetlights.

Feature 2: People or human presence: cluster 1—Most of the images have no people or only a few individuals present; cluster 2—No mention of people or human presence.

Feature 3: Streets/roads versus landmarks: cluster 1—Streets, roads, or related environments (like residential areas or intersections) are predominant; cluster 2—Several descriptions include recognizable landmarks (e.g., New York Public Library, the Statue of Liberty) in the background.

Feature 4: Natural elements: cluster 1—Images mostly lack trees, grass, or other vegetation; cluster 2—No mention of natural elements.

Feature 5: Mood or atmosphere: cluster 1—Images have a specific mood or atmospheric element (e.g., dark, cold, wet, or overcast); cluster 2—No mention of mood or atmosphere.

Feature 6: Rainy weather: cluster 1—No mention of rainy weather; cluster 2—Many of the descriptions involve rain or wet streets.

Feature 7: Absence of traffic signals, signs, or distinctive markings: cluster 1—No mention of the lack of such elements; cluster 2—Many descriptions note the lack of street signs, traffic signals, or other recognizable markings.

It can be observed that one or more of the discrepancies in the list above, may correspond to the first item listed in the weak spots mentioned. It is noted that the pipeline described above is fully automated and complements a biases analysis which can be performed separately to detect bias of the MuT.

This process enables the system to a nuanced understanding of the model's performance across different subsets of the data. By identifying common features within clusters, and comparing clusters that are similar in content but different in performance, the system can identify specific areas for improvement and develop targeted strategies for enhancing the model's accuracy and effectiveness. The weak spots that have been identified can be addressed by retraining the model with relevant/updated/modified weights, and/or by generating data points automatically using generative models. This can ensure that the MuT's performance in these areas meets the required standards.

In some embodiments, the protection platform (e.g., at the offline unit(s), and/or at the online unit(s), and/or at a local or on-premises implementation, and/or via a cloud-computing or remote unit implementation) may detect, and may protect against, a set of two or more Repeated Evasion Attacks, or a group of related Evasion Attacks; such that even if each one of the Evasion Attacks, by itself, is not necessarily detected, the aggregation of multiple events is detected to be a distributed or a multiple-attackers or a coordinated Repeated Evasion attack by multiple attackers or multiple malicious devices, or by a single attacker/single device that performs repeated or repeating (and, not necessarily identical to each other) Evasion Attack events from the same device or from a plurality of devices.

In some embodiments, the system or platform may optionally operate by correlating or matching input signals or inputs that derive from a plurality of distributed instances of a ML/DL/AI model; for example, particularly in a vehicular setting; and may utilize such correlation or matching for attack detection against such ML/DL/AI model or engine.

Some embodiments may include and utilize an AI-based Penetration Testing (Pen-Testing) Unit 128, which evaluates the vulnerability of the ML/DL/AI Engine 101 against different types of attacks in different settings. The AI-based Pen-Testing Unit 128 estimates the robustness level or the resilience level of the ML/DL/AI Engine 101 towards various attacks. The AI-based Pen-Testing Unit 128 collects or obtains data about historic or past attacks, and particularly of penetration attacks and penetration tests (and their corresponding results) that were carried out against this particular ML/DL/AI Engine 101, or against a plurality of ML/DL/AI Engines of the same type of the ML/DL/AI Engine 101 (e.g., historical attacks against image classification engines), or against a plurality of ML/DL/AI Engines in general; and constructs a dataset representing: (I) model features of the ML/DL/AI Engines that were pen-tested, such as, their type, size, architecture features (e.g., layer sizes and types); and (II) results of the penetration tests that were conducted against such ML/DL/AI Engine, such as, pen-test outcome (e.g., success or failure; level of success, percentage of success), accuracy of the ML/DL/AI Engines that were pen-tested, a robustness score or a resilience score or a vulnerability score against particular penetration attacks that were tested. The AI-based Penetration Testing (Pen-Testing) Unit 128 utilizes AI techniques, such as a. Deep Neural Network, to generate predictions regarding the pen-testing output that is forecasted or estimated or predicted with regard to the particular ML/DL/AI Engine 101 that is being evaluated or protected, without actually performing the time-consuming and effort-consuming pen-testing process. In some embodiments, an automated pen-testing unit or module may be used to perform a Genetic Algorithm (GA) to manipulate an LLMs, particularly when model architecture and parameters are inaccessible; for example, by optimizing a universal adversarial prompt that—by itself, and/or when combined with a user's actual/legitimate query—disrupts the attacked model's alignment, resulting in unintended and/or unauthorized and/or potentially harmful outputs; allowing to systematically reveal a model's limitations and vulnerabilities by uncovering instances where its responses deviate from expected behavior, and providing protection against an automated or semi-automated universal black box jailbreak attack.

System 100 may further comprise a Policy Design Tool and a Smart Fortification Process for protecting the ML/DL/AI Engine 101. The Applicants have realized that fortification of the ML/DL/AI Engine 101 may be a complex multi-objective constrained optimization problem. The optimization includes, for example, finding or detecting the best subset of defenses that are relevant and available, and choosing or setting or determining the best or most efficient defense parameter values. The optimization is multi-objective, since the defense would optimize robustness against different attacks in different scenarios along with the natural model accuracy. The optimization is constrained since there are limitations on the output model's prediction running time and computational requirements, along with the fortification process duration and memory required for the fortification. Other requirements from the output model may be that the new model will not alter some attributes of the input model, or that the fortification process will only use "black box" access to the original model.

In accordance with some embodiments, a Defense Policy Design Tool, or a Defense Policy Constructor Unit 140, may comprise a Pre-Fortification Unit 141 or a pre-fortification interface, which enables the owner or operator of the ML/DL/AI Engine 101 to configure and define its requirements from (or operational constraints of) the output model and from the fortification process; such as, prediction running time, prediction computational cost, total memory allocated for output model, fortification process access type to original model (e.g., "black box" or "white box" or other), fortification process duration, fortification process price/computational costs/resources costs, type of modification to original model that is allowed (e.g. allow or disallow re-training; only allow to add pre-processing, do not change original model but add an attack detection layer). Optionally, a Smart Fortification Unit 143 performs an algorithm for finding Pareto optimal solutions of the constrained optimization problem. In some embodiments, optionally, the evaluation of each model proposal may include performing of at least one penetration test attempt. The selection process may use one or more of the following techniques or considerations: Using multi-objective optimization algorithms; Using limited Budget search algorithms for bounded time fortification process; Using AI-Based Pen-Testing for fast Pen-Testing Approximation; Using Covering Algorithms for finding optimal subset of defenses that covers all relevant attacks; Grid Search algorithms; using Evolutionary/Genetic algorithms Optionally, a Post-Fortification Unit 142 or a post-fortification interface may allow browsing and inspecting the different fortification results, for choosing the best particular fortification solution to suit the requirements and constraints, optionally including an efficient mechanism to explore pareto-optimal options.

Optionally, an AI-based Model Fortification Unit 144 may perform AI-Based Prediction of the most suitable or efficient fortification policy, or may determine the efficient or suitable subset of available and relevant defenses and their corresponding efficient defense parameter values. For example, the AI-based Model Fortification Unit 144 may collect historical data or past data about Models, customer requirements and constraints, and their corresponding fortification results. Then, the AI-based Model Fortification Unit 144 constructs a dataset of: (I) model features, such as, type, size, architecture features (e.g., layer sizes and types); and (II) the requirements or constraints as defined by the owner or operator of the particular ML/DL/AI Engine 101 that is being evaluated or protected; and (III) results of fortification methods and their corresponding fortification parameter values. A suitable AI technique, such as Deep Neural Network or Random Forest, may be used to predict or to determine the suitable or efficient subset of fortification techniques, and their respective parameters, that are predicted or determined to provide the best or most efficient fortification to the particular ML/DL/AI Engine 101 that is being evaluated or protected, while maintaining the defined constraints and while achieving the defined requirements, and without actually performing the time-consuming and computational resources consuming fortification process over many iterations on the particular ML/DL/AI Engine 101 that is being evaluated or protected.

Some embodiments may include a Region of Interest (RoI) based Protection Unit 150, for providing protection and/or fortification to the particular ML/DL/AI Engine 101 that is being evaluated or protected. For example, some conventional (e.g., non-AI-based) algorithms for image processing tasks may be more robust to adversarial attacks, while on the other hand may also be less accurate. For example, the task of detecting what is the Region of Interest (RoI) in a given image is a task that was investigated and has various non-AI algorithms that address it. Some embodiments may include defense techniques that combine both classical algorithms (e.g., RoI detection algorithms) with an AI-based protection unit, to achieve both robustness and accuracy in protecting the ML/DL/AI Engine 101.

Accordingly, a Gradient/RoI Adversarial Input Detector Unit 151 may be used. When classifying an image using a ML model, and in particular using Deep Neural Network (DNN), the system may derive the gradient of the model at the input; for example, the gradient is a matrix with the same shape as the input image. The values in the gradient are (or indicate, or correspond to) the level of importance of the pixels in the classification process of the specific input image. For example, if a DNN correctly classifies a cat image, then the gradient would show that the important pixels in the classification process were those of the nose, ears, and eyes of the cat.

Therefore, an input image may be determined to be an adversarial image, by: (a) Calculating the input image's gradient according the ML model; (b) generating the region of interest (ROI) of the image using a classical algorithm or a deterministic algorithm or a non-ML algorithm; (c) comparing the gradient and the ROI; if they are consistent with each other or match each other, then approving the image as a legitimate input image or as non-adversarial input image; if they are inconsistent or contradicting to each other or non-matching, then reject or flag the input image as adversarial input image. The comparison or the matching process may be performed, for example, using a trained ML algorithm that is dedicated for this specific comparison task; and/or by using a deterministic algorithm that verifies that a pre-defined threshold value (e.g., at least 70 percent, or at least N percent) of the important pixels is indeed inside the ROI.

In some embodiments, a ROI Pre-Processing Unit 152 may be used to perform pre-processing operations for a given input image for the above task; for example, by: (a) detect or determining the ROI; and (b) replacing all pixels in that input image, that are located outside of (or externally to) the ROI, with one of the following: (i) a constant value (e.g., zero); (ii) values corresponding to smoothing or strong smoothing of the original image pixels; (iii) random or pseudo-random values; (iv) a combination of the above values.

Some embodiments may comprise an Adaptive Fortification Unit 155, or a Hybrid Online and Offline Protection Unit 156, which may operate to further protect the ML/DL/AI Engine 101 against attacks or adversarial inputs or attacks or malicious inputs. The model fortification is a multi-objective constrained optimization task. The task includes finding a model that is concurrently optimal in accuracy and parameters and also in its robustness to different threats, while being constrained by user requirements of prediction running time, prediction CPU usage and memory usage, or other constraints. In addition to solving the optimization problem in a static setting, solving the optimization problem in a dynamic setting may be beneficial. For example, CPU/processing costs, memory utilization costs, database utilization costs, and/or other costs of resources utilization, may change dynamically over time; and similarly, the query load on the ML/DL/AI Engine 101 may change over time; and the probability of the different threats may change over time (e.g., on a particular day, it may be known that ML/DL/AI Engines in a region or worldwide are being attacked by a particular adversary, or due to a particular vulnerability or malware that is currently spreading and operational). The system may thus utilize an algorithm that dynamically adjusts or modifies or re-configures the model itself, namely the ML/DL/AI Engine 101 itself and its internal model, in a dynamic or online manner (e.g., once per day; twice per week; or even once per hour, or at other time intervals) according to the changing requirements and changing values of the above-mentioned parameters. For example, the fortification process of the ML/DL/AI Engine 101 may be scheduled to be executed every H hours, or every D days; and/or an AI-based algorithm and online optimization algorithm may be utilized to provide additional response to a dynamic environment of changing threats and/or changing parameter values.

Some embodiments may utilize an Online Defense and Protection Unit 157, which may perform ML/DL/AI Engine 101 protection operations in real-time or near-real time. Such service may be web-based, or may include a locally-installed software component and/or hardware component, optionally, supporting an Application Programming Interface (API) for improved configuration and utilization. Such operations may include, for example: (A) Online input preprocessing, in which the protected ML/DL/AI Engine 101 firstly sends an input item (e.g., an input image) to the Online Defense and Protection Unit 157, and then receives back from it a "sanitized" input or a "corrected" input (e.g., by applying one or more modifications to the input that may cancel or alleviate or reduce the negative effects of the adversarial manipulations that were done to it), or an approved input (e.g., the input image is returned, with an indication that it is legitimate or non-adversarial or non-malicious), or receives back an indication that the input item is malicious or adversarial and should be discarded or should not be processed by the protected ML/DL/AI Engine 101; and the input that is received from the Online Defense and Protection Unit 157 is then passed to the protected ML/DL/AI Engine 101 for further processing (if approved). In a demonstrative example, a protected ML/DL/AI Engine operates to classify images of humans as either male or female; and the Online Defense and Protection Unit 157 adds a pre-processing filter or analysis or check, whether the input image is (at all) human or non-human (e.g., dog, chair), to thus protect the protected ML/DL/AI engine from such input signals that are possibly attack-related and/or that may cause the ML/DL/AI engine to fail or to output incorrect results. (B) Online adversarial input identification; the protected ML/DL/AI Engine 101 sends the input item (e.g., input image) to the Online Defense and Protection Unit 157, and receives back a classification indicating whether the input item is adversarial or non-adversarial; (C) Online attack pattern detection, in which the protected ML/DL/AI Engine 101 (or a monitoring component associated therewith) sends all or substantially all or most of some of the inputs that are received at the protected ML/DL/AI Engine 101, to the Online Defense and Protection Unit 157, which in turn analyzes the series of inputs and identifies an attack pattern (e.g., identifying a series of Cat images that are pre-labeled as Dogs); and when an attack pattern is detected (e.g., by detecting an attack pattern which is a series of inputs (or images) that are very similar to each other yet they differ only in several bits or bytes (or pixels); or a series of images that seem to be a result of a search/optimization process), the Online Defense and Protection Unit 157 may notify the owner or operator of the protected ML/DL/AI Engine 101 that such attack was detected, and/or may generate a trigger to block or quarantine or discard or to avoid processing of certain queries or inputs from a particular source or that have a common characteristic. (D) Online Monitoring of attacks, and generating relevant model(s) or graphs or charts representing detected attacks and ML security related Key Performance Indicators (KPIs). (E) Online time delays, in which the protected ML/DL/AI Engine 101 firstly sends to the Online Defense and Protection Unit 157 an input item along with an identifier of the input's source; and the Online Defense and Protection Unit 157 injects or intentionally adds a time-delay (e.g., of T seconds or T minutes; wherein T is a pre-defined number; or wherein T is selected randomly or pseudo-randomly within a pre-defined range of values) before returning the input to the protected ML/DL/AI Engine 101 for processing; or wherein T is selected based on Pen-Testing of ML/DL/AI Engine 101, or based on outputs generated by the Smart Fortification Unit 143; the time delay may be dependent on the input source and/or on the input item itself; the time delay may block or weaken or slow-down or de-incentivize certain attacks, such as a Stealing Attack, that require numerous queries to the protected ML/DL/AI Engine 101. (F) Query Quota or Rate Limiting, in which the protected ML/DL/AI Engine 101 firstly sends to the Online Defense and Protection Unit 157 the input item along with an identifier of the input's source, and the Online Defense and Protection Unit 157 determines whether or not to block that particular source according to a query quota that is associated with that particular source; the quota may be pre-defined, or may be dynamically allocated and/or configured, based on one or more parameters or conditions, such as, taking into account a level of similarity among multiple inputs/multiple queries that have arrive within the past T minutes from the same source, and/or other parameters (e.g., outputs or values generated by the Smart Fortification Unit 143). (G) a Blacklisting process, in which the protected ML/DL/AI Engine 101 firstly sends to the Online Defense and Protection Unit 157 an input along with an identifier of the input's source; and the Online Defense and Protection Unit 157 then decides whether or not to block that source according to a blacklist of sources and/or a blacklist of particular inputs or queries.

In some embodiments, the Online Defense and Protection Unit 157 may thus allow protection that does not require modification of the original ML Model; may allow efficient integration and utilization of complex protection techniques, with minimal or no changes to the protected ML/DL/AI Engine 101 itself; may allow a behavioral defense method which detects an attack pattern across (or from) a series of inputs or a series of queries; may allow applying and using confidential defense methods that are provided by a remote server of the Online Defense and Protection Unit 157 as a "black box" solution that provides to the protected ML/DL/AI Engine 101 an output (e.g., "input is legitimate" or "input is adversarial") without exposing the method(s) that such remote "black box" unit employs to reach such determination; and may allow separation between the ML/DL/AI Engine 101 (and its original model) and the unit that provides the protection layer to it. In some embodiments, the online defense that is provided by the system may allow each of both parties to keep their confidential information secret: the protected ML/DL/AI Engine 101 itself and its internal methods of operations may be kept undisclosed while being protected against attacks, and/or the protection service (which protects the ML/DL/AI Engine 101) may be provided as a web-based or remote or locally-installed or co-located or cloud-based "black box" protection service which does not disclose or reveal its internal methods of operation.

Some embodiments may further utilize an Online AI-Based Defense Unit 158, which may utilize one or more (e.g., remote, cloud-based) AI/ML/DL engines (e.g., using DNN, Random Forest, Evolutionary/Genetic algorithms, or other techniques) to select which protection scheme or protection operations to apply (or not to apply) to the protected ML/DL/AI Engine 101 and/or with regard to a particular input (or set of inputs) that is incoming to the protected ML/DL/AI Engine 101; as well as which pre-processing operations or pre-classification operations to apply or to perform on such input(s), which re-trained model(s) to apply, which detection algorithms to apply, and/or other operations which may be selectively determined as applicable or suitable, or which may be selected from a pool of pre-defined attack mitigation operations based on such AI/ML/DL output of the Online AI-Based Defense Unit 158. In some embodiments, the Online AI-Based Defense Unit 158 functionality may assist in achieving the dynamic fortification that allows the system to address dynamic requirements. For example, a database or a dataset may be created, with characteristics of various types of ML/DL/AI engines, with characteristics of their particular dataset and model, with characteristics of known attacks that were detected towards them, with the mitigation/protection operations that are relevant for each type of engine and dataset and attack, and for the results (success/failure; or a success score as a percentage value) for a particular mitigation/protection operation with result to a particular attack towards a particular engine or dataset or or engine-and-dataset combination. Such data may be subject to ML/DL/AI analysis or classification, in order to estimate or predict or deduce which attack vectors may be relevant towards a particular (e.g., new) protected ML/DL/AI engine, and/or which mitigation or protection techniques may be useful or effective towards such attack(s) against such protected ML/DL/AI engine. In some embodiments, a Dataset Integrity Analysis Unit may operate as part of the system or platform, to estimate and/or to quantify the level of integrity of the dataset that is currently utilized by the ML/DL/AI engine and/or by its model and/or that was used to train such engine and/or that was used to construct such model; and one or more mitigation operations or re-training operations or adversarial training operations, or dataset pruning or replacing or augmenting operations, may be invoked by the system in response to a Dataset Integrity score that is below a pre-defined threshold value.

The Online AI-Based Defense Unit 158 may be responsible for selecting an appropriate (or, the most appropriate) online defense per each particular input that is incoming towards (or into, or that is about to enter) the protected ML/DL/AI Engine 101. The Online AI-Based Defense Unit 158 may be implemented (or may operate) based on dynamic fortification history and/or based on outputs of the Smart Fortification Unit 143, and/or based on outputs of the AI-based Model Fortification Unit 144 that combines ever-improving model(s) based on experience or insights from the fortification history.

The system may further include an Online Defenses Monitoring Unit 159, which generates an on-screen display or notifications or a dashboard that enables a user (e.g., an owner or operator of the protected ML/DL/AI Engine 101) to monitor the attacks that were attempted or are ongoing towards his ML/DL/AI Engine 101, as well as the protection mechanisms that are or were applied and their results. The Online Defenses Monitoring Unit 159 may enable the user, for example: to obtain a graph or chart or list or other representation of the history of attacks that were detected and/or blocked and/or evaded, and the success rate of such attacks and/or of the mitigation operations that were applied; to manually label particular usage statistics, and/or to configure particular parameters and constraints that are utilized by the system; to obtain data about CPU/Memory usage and running time usage per each online defense mechanism; to obtain defense effectiveness statistics and defense success data, such as, the percentage of inputs that were identified as adversarial (out of all inputs), and the percentage of adversarial inputs that were successfully blocked in time or that were subject to pre-processing operations or quarantine or discarded; information or generated insights about pen-testing history of the protected ML/DL/AI Engine 101 (e.g., particularly when a protection attribute or a protection-related characteristic is changed dynamically); and/or other relevant parameters.

The system may further comprise an Attack Investigation Console Unit 160, which enables an attacks investigator and/or the operator of the ML/DL/AI Engine 101 to perform investigation operations regarding one or more attacks that were performed against the ML/DL/AI Engine 101, thereby providing or generating additional important information or insights regarding the required or suitable reactions or mitigation operations. The Attack Investigation Console Unit 160 may generate and provide, for example: data about distribution of the adversarial label, for example, for evasion attacks in which the attacker attempts to trick the model into classifying some input incorrectly, indicating the distribution of the classification that the attacker tried to achieve (e.g., indicating that the attacker has attempted to attack classification of Animal images, and not of Vehicle images); data about distribution of the type of attack (e.g., model stealing, dataset information stealing, poisoning exploitation, evasion, or other attacks); data indicating whether the attack was a "black box" attack or a "white box" attack, wherein detection of a "white box" attack may lead the system to generate a warning that the Model itself is estimated to have been stolen; data indicating whether the attack is a known attack (e.g., an attack that utilizes one or more open-source tools or previously-seen attack tools), or is an unknown attack (e.g., an attack that utilizes a never-before-seen attack tool or attack vector or attack surface or attack technique), which in turn may also generate an indication regarding the level of threat or risk associated with the attack; and/or other insights. The Attack Investigation Console Unit 160 may further enable to efficiently send or route or re-route suspicious inputs to manual re-labeling or re-classification, to generate insights about the true or the full extent or scope of the attack, to initiate sandboxing operations or quarantine operations with regard to particular components and/or data-portions and/or dataset(s) and/or engine(s), to enable visualizing and/or initiation of sandboxing of one or more features or functionalities, to generate a visual or an on-screen representation of two or more protection techniques or fortification techniques that operate together or in parallel or in series, to generate a visual or an on-screen representation of pen-testing results, to generate a dashboard representing or showing currently deployed and/or currently available and/or currently unavailable protection techniques and/or fortification techniques, to generate visual or on-screen representations that depict fortification or protection of particular ML/DL/AI unit(s) within a compound ML/DL/AI system or engine, and/or to perform or to trigger other mitigation operations (e.g., enabling the investigator to manually quarantine a set of inputs, or inputs that are received from a particular source, or inputs that share a particular characteristic).

The Applicants have realized that in some situations, an owner or operator of the ML/DL/AI Engine 101 may wish to determine the robustness of his ML/DL/AI Engine 101, without sharing information about the ML/DL/AI Engine 101 or its internal model(s) or component(s) or logic. However, realized the Applicants, some types of attacks may be a "white box" type of attack, in which partial knowledge or full knowledge of the attacked ML/DL/AI Engine 101 is already in the hands of the attacker. The Applicants have realized that in some situations, a "white box" attack may require from the attacker to know only the result of a specific computation (for example: the gradient of the model for a certain input) in order to carry out the attack. Accordingly, an Undisclosed Model Pen-Testing Unit 162 may perform pen-testing of a "white box" attack against the ML/DL/AI Engine 101, while maintaining confidentiality of the model or components of the protected ML/DL/AI Engine 101. For example, a server or a computer that hosts the ML/DL/AI Engine 101, or that is operably associated with the ML/DL/AI Engine 101, may be configured by installing thereon a testing module (e.g., optionally implemented as an open source module, or as a module having source code that can be inspected by the owner of the ML/DL/AI Engine 101 or by a trusted auditor), and the installed testing module only performs the required computation for the "white box" attack (e.g., calculates the gradient of the model for a certain input). The system performs a pen-test which carries out the "white box" attack by sending a request to the testing module to perform the computation and then send its result(s) back to the Undisclosed Model Pen-Testing Unit 162 (e.g., implemented as a remote pen-testing server) for further evaluation or analysis there.

Additionally, the system may provide protection from attacks even if there is no information about the ML/DL/AI Engine 101 or its model; for example, by selectively activating only remote or cloud-based non-intrusive protection unit(s), such as units that detect malicious or suspicious inputs or queries regardless of the manner in which the ML/DL/AI Engine 101 operates. Optionally, the system may perform a search on the defense options that are available, and for each option may evaluate the robustness of the protected ML/DL/AI Engine 101 using the Undisclosed Model Pen-Testing Unit 162, or using techniques that test for robustness against conventional "black box" attacks, or using other techniques.

Some embodiments may utilize one or more Pen Testing units or modules, such as one or more of units 121 or 128 or 162 described above, for evaluating the robustness of the ML/DL/AI Engine 101. The evaluation may be performed using empirical methods or deterministic methods; for example, performing a particular attack against the ML/DL/AI Engine 101, and analyzing the results of the attack; and/or by using other methods, for example, mathematical analysis or computational analysis of the structure of the ML/DL/AI Engine 101 if such structure is partially known or is fully known to the pen-testing unit. The Pen-Testing unit may be a modular tool which may be efficiently updated to enable testing of new attacks and new theoretical or computational evaluation methods.

Some embodiments may optionally utilize or provide Intrusive Defenses to the ML/DL/AI Engine 101; for example, using Secure Pre-Trained Models, Adversarial Training, Architecture Modification, Ensembles Training, Model Re-Training, Dataset Pre-processing, Dataset Augmentation, Dataset Sanitation or Sanitization, and/or other techniques.

For example, and Adversarial Training Unit 163 may operate to increase the robustness of the protected ML/DL/AI Engine 101, by applying an adversarial training defense against one or more known attacks; optionally utilizing a component or module that is installed locally on or at the server the runs the ML/DL/AI Engine 101, or as a component that is operably associated therewith. Optionally, pre-processing based adversarial training and/or post-processing based adversarial training may be used, including adversarial training with regard to ML/DL/AI Engine 101 that is considered an undisclosed model. Optionally, some embodiments may use adversarial training of a pre-processing element added to the ML/DL/AI Engine 101, and/or adversarial training of a post-processing element added to the ML/DL/AI Engine 101, including adversarial training with regard to ML/DL/AI Engine 101 that is considered an undisclosed model.

In some embodiments, adversarial training may be applied in other ways; for example, a Neural Architecture Search (NAS) technique may be used, such that the neural architecture or model that is utilized by the protected ML/DL/AI Engine, or one or more characteristic or properties of the neural architecture or model, is or are part of a hyper-parameter search space; and a NAS unit predicts or estimates the optimal architecture or model for a given task; and optionally, the preferred or the optimal model or architecture is then trained with an adversarial training protocol to achieve hardening or robustness against adversarial attacks.

Optionally, one or more Non-Intrusive Defense Unit(s) 164 may be used by the system; for example, performing pre-processing and/or post-processing, evasive input classification, evasion classification defenses, and/or other non-intrusive defenses that do not require partial or full re-training of the original model. The incorporation of such defenses may be done in a modular way, so that new defenses that are developed may be efficiently added to the system.

In some embodiments, a Poisoning Detection and Repair Unit 165 may operate to detect and repair models and/or datasets that were subject to a poisoning attack. This unit may operate under one or more user-defined constraints; for example, a constraint that re-training is now authorized, or an undisclosed dataset, or an undisclosed model. The unit may be constructed in a modular way to efficiently add or utilize new detection methods and/or new repair methods.

Some embodiments may provide Real-Time Defense as a Real-Time Service to the ML/DL/AI Engine 101 which runs on its regular (e.g., "production") server and environment. Such defense may include, for example, real-time pre-processing, real-time post-processing, real-time adversarial input classifier, real-time pre-processing of ensembles, real-time backdoor poisoning mitigation, real-time backdoor poisoning exploitation detection, and/or other services that may be dynamically provided as a cloud-computing based service or as a remote service.

Some embodiments may utilize a Real-Time Model Access Restriction Unit 166, to enable protection of the ML/DL/AI Engine 101 which runs in "production", by selectively restricting or limiting access to the ML/DL/AI Engine 101; for example, by introducing or injecting or intentionally adding response time delays and/or user query quota and/or rate limiting, which may be effective against some "black box" evasion attacks, "black box" reprogramming attacks, stealing attacks, and/or other attacks. The unit may also assist in blocking various attacks by using and enforcing a user-defined or user-configurable blacklist.

Optionally, restrictions parameters may be dynamically selected and enforced based on pen-testing of the model or the ML/DL/AI Engine 101.

The system may thus provide real-time attack detection, attack blocking, attack mitigation, and attack monitoring. For example, the system monitors and inspects inputs that are incoming to the ML/DL/AI Engine 101 and/or outputs generated by the ML/DL/AI Engine 101, while the ML/DL/AI Engine 101 runs and operates ("in production"), and analyzes such inputs and outputs to detect an attack and to mitigate it. Once an attack is detected and identified, the system triggers real-time or near-real-time query blocking, real-time or near-real-time user blocking, sends relevant attack information to a monitoring system, and generates and sends a notification to an administrator or to one or more recipients; as well as performing other mitigation operations (e.g., rate limiting; query quota configuration and enforcement; time delay injections; quarantine or discarding of inputs or of queries; sanitizing of inputs or queries; intentional modification or randomization of outputs (e.g., to counter-attack or to confuse an attacker); taking one or more components of the ML/DL/AI Engine 101 offline; or other mitigation operations).

Some embodiments may utilize a Protection Policy Configuration Unit 167 or similar design and configuration tool, which enables a user to configure, modify and optimize multiple dependent and independent parameters, such as model accuracy on natural inputs, model accuracy under each type of attack, computational resources for model prediction, and/or other parameters or constraints, in order to increase robustness of the ML/DL/AI Engine 101 against attacks or threats. The Protection Policy Configuration Unit 167 enables the user to explicitly consider, select, approve and/or disapprove various parameter trade-offs, and to choose or define or configure a protection scheme that best fits the user's requirements, goals, and constraints.

It is clarified that the ML/DL/AI Engine 101, which is protected by some embodiments, need not necessarily be a single unit or a stand-alone unit or a single-component unit; rather, some embodiments may similarly protect a chain or set or group or batch or "computing farm" other collection of two or more (or numerous) ML/DL/AI Engines or units, that may be operably associated with each other, or which may operate in parallel and/or in series and/or concurrently and/or simultaneously and/or sequentially, or a multiple-component ML/DL/AI Engine or sub-system, or a multiple-model ML/DL/AI Engine or sub-system, or an ML/DL/AI Engine which includes a combination or a composition of multiple units or components. It is emphasized that in accordance with some embodiments, the protection system may serve and protect, simultaneously or concurrently or in parallel, multiple different customers or multiple different independent ML/DL/AI Engines, which may be entirely independent of each other, and/or which may be remote from each other, and/or which may be owned or operated by different entities, and/or which may be of different types.

For demonstrative purposes, some portions of the discussion may relate to a protected ML/DL/AI Engine which receives as input an image or a photo or a graphical data-item; however, these are only non-limiting examples, and some embodiments may similarly protect other types of ML/DL/AI Engines and/or may protect ML/DL/AI Engines that receive (or that process, or that operate on) other types of data, for example, textual data, numeric data, alpha-numeric data, tabular data or tabulated data, array or matrix or table of data-items or values, data arranged or formatted as fields or records, non-graphical data, graphical data, video data, audio data, audio-and-video data, raw data, processed data, partially-processed data, user-provided data, machine-generated data, data collected or received from sensors or sensing units (e.g., accelerometer data, gyroscope data, temperature data, spatial orientation data), biometric data (e.g., fingerprint scan, retina scan, eye scan, face scan or facial image), financial data, finance-related data, data that is intended for OCR, data obtained from (or provided as) a text file or a spreadsheet file or an XML file or a CSV file or a database file, inputs that are a combination of two or more types of data, inputs that are provided as a combination of two or more data formats, data items that are accompanied by meta-data (e.g., indicating how or where or when the data was collected or obtained), and/or other types of data.

Figure 2:
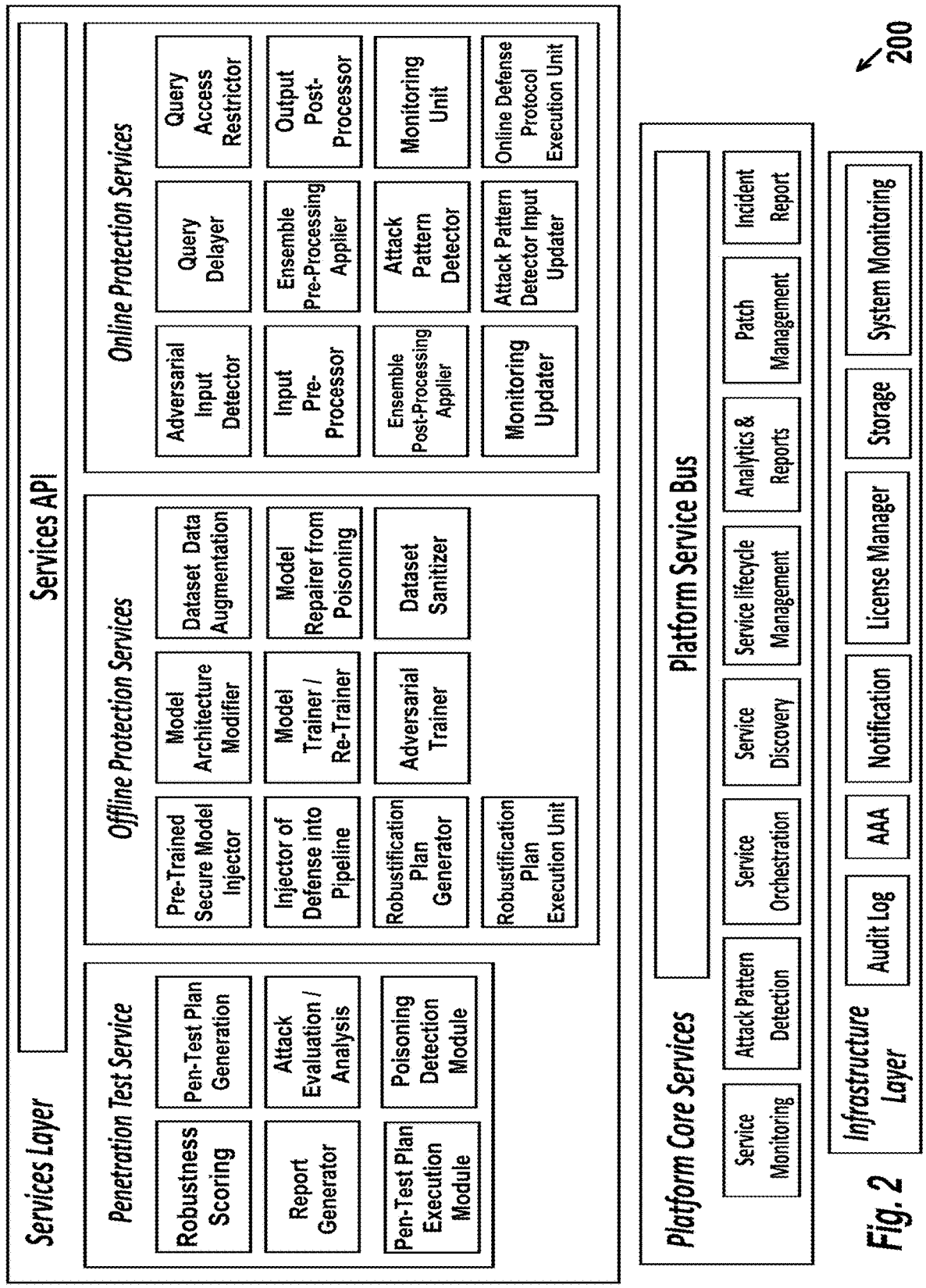
FIG. 2 is a schematic block-diagram illustration of a system and its multi-layer architecture, in accordance with some demonstrative embodiments.

Reference is made to FIG. 2, which is a schematic block-diagram illustration of a system 200, in accordance with some demonstrative embodiments. Optionally, system 200 may be a demonstrative architecture implementation of system 100 of FIG. 1. System 200 utilizes a modular architecture which allows scalability, and may be implemented as a cloud service or as a cloud-computing service, for a single user or for multiple users; or it may be implemented and installed locally (e.g., as licensed software or module that is co-located with the protected ML/DL/AI Engine). The architecture and components of system 200 may support several features of the protection scheme: (a) Penetration testing, via evaluation of the robustness of the protected ML/DL/AI Engine against various threats or attacks; (b) Offline Protection, by modifying or re-configuring the protected ML/DL/AI Engine to become more secure or more resilient against attacks; (c) Online Protection, by providing defensive services for the protected ML/DL/AI Engine in real-time or near-real-time; (d) Attack mitigation services; (e) Protection Sandbox Environment that enables manual/customized experimentation by the user in order to investigate or test or research particular vulnerabilities and protection schemes.

In some embodiments, a Hybrid approach may be used, such as by using Hybrid Adversarial Training; such that, for example, one or more tasks or operations of the protection service are performed at a cloud-based platform or at a remote server that is located remotely from (and is separate from) the protected ML/DL/AI Engine, and one or more other tasks or operations of the protection service are performed on the client side or at the protected ML/DL/AI Engine; for example, the cloud-based platform generates adversarial samples and provides them to the protected ML/DL/AI Engine, and the protected ML/DL/AI Engine performs the training based on the dataset that now includes those adversarial samples. Other hybrid or distributed implementations may be used.

Some embodiments may optionally utilize a cascade of multiple detectors or protection units, or a Detectors Cascade sub-system; for example, by implementing a set or series or line or group of detectors, and by applying only one or only some (and not all) of those detectors with regard to any input signal (e.g., that is directed to the protected ML/DL/AI Engine); and such that output(s) generated by the detector(s) that were already activated, dictate whether (i) a decision has been adequately reached with regard to a particular input signal, or (ii) one or more additional detectors should be invoked for that particular input signal and then their output is analyzed similarly (e.g., whether a decision can be reached, or whether additional detector/s should be invoked). In some embodiments, a faster detector or a less resource-demanding detector, is placed before slower detectors or more resource-demanding detectors, in the Detectors Cascade, in order to allow the system to firstly attempt to reach a decision based on faster and less resource-demanding detection or decision processes, before invoking slower or more resource-demanding detection or decision processes.

In some embodiments, the protection platform or the protection system may include or may provide a "sandbox" experimentation tool or feature, which enables the user (e.g., the owner or administrator of the protected ML/DL/AI Engine) to experiment and explore and evaluate different protection methods or different protection schemes or different protection configurations, and/or different vulnerabilities or attacks, in a controlled or "sand-boxed" environment which does not cause actual damage to the protected ML/DL/AI Engine. For example, the protected ML/DL/AI Engine may be duplicated into a temporary copy, such that it can be tested or experimented upon in a temporary manner and without affecting the "real" protected ML/DL/AI Engine which remains untouched.

In some embodiments, one or more features or functionalities of the platform may be accessible and/or programmable via an Application Programming Interface (API) and/or via a Software Development Kit (SDK) or a "dev-kit", which may enable the user (e.g., the owner or administrator of a protected ML/DL/AI Engine) to interact with the platform and/or to create scripts and/or code portions that automate one or more interactions with the platform and/or that automatically provide commands to the protection platform and/or that automatically apply one or more pre-programmed rules to output (or to alerts) generated by the protection platform.

In some embodiments, a "cloud-based" implementation of the protection platform, or of some (and not necessarily all) of its functionalities, may be implemented using a remote cloud-based computer and/or by utilizing "on-prem" or "on-premise" deployment in which some (or all) of the functionalities are deployed locally at the premises of the user (the owner or administrator of the protected ML/DL/AI Engine, at private infrastructure of such user and/or at a private cloud-based deployment or via other suitable type(s) of Software as a Service (SaaS) deployment.

In some embodiments, a plurality of Protection Policies (or Defense Policies) may be pre-defined in the system, and/or may be configured or defined or modified from time to time by the user (e.g., the owner or the administrator of a protected ML/DL/AI Engine); and one or more rules may further be defined to enable the protection system to automatically switch from a first Protection Policy to a second, different, Protection Policy, if one or more pre-defined conditions hold true, and/or if a triggering event occurs or is detected, and/or if the value of one or more particular parameters is beyond a pre-defined threshold value, and/or based on other types of conditions or triggers. For example, a Protection Policy or a Defense Policy may reflect several considerations or goals or constraints that may be configured by the user (e.g., the owner or the administrator of a protected ML/DL/AI Engine); for example, (i) the target accuracy or the target validity or the target correctness of the output generated by the protected ML/DL/AI Engine, (ii) the target level of protection that is desired or intended to be achieved, (iii) resource related constraints (e.g., processing cycles, processing time, time-to-decision, memory resources, storage resources), (iv) constraints or goals that may be related to other business-related or technology-related features (e.g., ability to audit or explain performance-related decisions of operations), (v) cost or budget constraints. Accordingly, the user (e.g., the owner or the administrator of a protected ML/DL/AI Engine) may modularly define a Defense Strategy or a Protection Strategy, reflected in such Protection Policy or Defense Policy, that takes into account and that reflects said goals and/or other goals or constraints. The protection platform may then advise the user which Protection Suite(s), or which particular features or functionalities of the protection platform, may be suitable or may be available to achieve such goals and/or to comply with such constraints; and in some embodiments, the protection platform may even select automatically and autonomously to switch from a first set of protection operations (e.g., a first Protection Suite) to a second, different, set of protection operations (e.g., a second Protection Suite), and/or to modify values of one or more parameters or constraints.

For example, the user may define goals such as, (i) not more than 8 percent of inputs should be blocked or should be regarded as malicious, and (ii) up to 6 gigabyte of RAM may be allocated for input analysis and attack detection, and (iii) up to 450 clock-cycles of two processing cores may be allocated for input analysis and attack detection; and at a certain time-point, once the invocation of a particular Protection Suite reaches those constraints, the Protection Suite (or the operational parameters that it utilizes) may be automatically adapted or modified by the Protection Platform in order to remain within the goals or the constraints as defined in the Protection Policy.

Accordingly, some embodiments may utilize a dynamic or a dynamically-changing or a dynamically-changeable Protection Policy, as well as dynamic or dynamically-changing or dynamically-changeable or dynamically-switchable Protection Suites. The dynamic properties are important since, for example, monetary costs of computing resources may dynamically change, and/or because a new vulnerability may cause a sudden spike in a certain type of attacks, and/or because a particular event (e.g., a war between two nations, or a business conflict between two corporations) may cause a spike in attacks against a particular ML/DL/AI Engine. The system may thus provide a dynamically-changing or dynamically-adjusting aggregation of protection functionalities, that takes into account (and complies with) said constraints and said goals; and this may be implemented at the online or cloud-based platform and/or at the on-premises deployed unit(s) and/or at the Attack Mitigation Unit 124 and/or at other suitable units of the system.

In some embodiments, the system may perform dynamic or periodical optimization or modification or adjustment (or switching) of defense policies, and/or of the defense techniques or protection functionalities that are applied to enforce or to achieve a particular defense policy or protection policy or its goals or its constraints, based on one or more rules or parameters or conditions or analysis; for example, by considering and analyzing a history of performance of defense/protection optimizations and/or modifications; by extracting features from the particular use case (e.g., the characteristics of the particular ML/DL/AI being protected, system type, dataset type, dataset size, overall dataset features, dataset features that are generated using an auto-encoder, model type), and may train an AI-based system (e.g., Deep Neural Network (DNN), Graph Neural Network (GNN), clustering method, Nearest Neighbor method, combination of such or other methods) to predict or to estimate an effective defense suite and/or the effective combination or aggregation of protection functionalities that would reach the goals (or, the highest number of goals) from the goals that are defined by the Protection Policy, while also complying with the system utilization constraints (e.g., operational constraints, processing resources constraints, memory constraints, time constraints, false-positive threshold constraint, false-negative threshold constraint) or with the highest number of such constraints. In some embodiments, optionally, a first Differential Weight Formula may be used with regard to the various Goals that are defined in the Protection Policy, since a particular goal (e.g., to block 98 percent of attacks) may be assigned a greater weight relative to another particular goal (e.g., to have not more than 7 percent of false positive errors); and similarly, optionally, a second Differential Weight Formula may be used with regard to the various Constraints that are defined in the Protection Policy or by the system administrator (e.g., the owner or administrator of the protected ML/DL/AI engine), since a particular Constraint (e.g., to use not more than 5 gigabytes of RAM) may be assigned a greater weight or a greater rigidity relative to another particular constraint (e.g., to finish all computations with regard to any input signal within 6 seconds of receipt of the input signal). The output of the weighted formula may be used as a consideration in the dynamic optimization or modification (or switching) of the Protection Policy and/or of the protection functionalities that are applied.

Some embodiments provide a system comprising: one or more processors that are configured to execute code, wherein the one or more processors are operably associated with one or more memory units that are configured to store code. The system is configured to protect a Protected Engine that is a unit selected from the group consisting of: a Machine Learning (ML) unit, a Deep Learning (DL) unit, an Artificial Intelligence (AI) unit, a Neural Network (NN) unit, a Large Language Model (LLM) unit. The system is configured to protect the Protected Engine against malicious inputs and malicious queries and malicious training data and malicious attacks. The system comprises at least one of (or, in some implementations, both of): (a) an Offline Protection Unit, to analyze one or more characteristics of the Protected Engine, and to perform offline fortification of said Protected Engine against attacks by changing one or more operational properties or operational parameters of the Protected Engine and to reduce its vulnerability to attacks; (b) an Online Protection Unit, to perform analysis of at least one of: (i) one or more inputs that are directed to be inputs of the Protected Engine, (ii) one or more outputs that are generated by the Protected Engine; and based on said analysis, to dynamically perform online fortification of said Protected Engine against attacks by dynamically changing one or more operational properties or operational parameters of the Protected Engine and to reduce its vulnerability to attacks.

In some embodiments, the Protected Engine utilizes a Protected Model that is selected from the group consisting of: a ML model, a DL model, an AI model; wherein at least one of the Offline Protection Unit and the Online Protection Unit, automatically modifies said Protected Model, from a pre-modification model version that is vulnerable to a particular attack, to a post-modification model version that is not vulnerable at all or that is less vulnerable to said particular attack.

In some embodiments, the Protected Engine operates based on a Protected Dataset; wherein at least one of the Offline Protection Unit and the Online Protection Unit, automatically modifies said Protected Dataset, from a pre-modification dataset version that causes the Protected Engine to be vulnerable to a particular attack, to a post-modification dataset version that causes the Protected Engine to be not vulnerable at all or less vulnerable to said particular attack.

In some embodiments, the Protected Engine operates based on a Protected Dataset; wherein at least one of the Offline Protection Unit and the Online Protection Unit, automatically modifies said Protected Dataset, from a pre-modification dataset version that causes the Protected Engine to be vulnerable to a particular attack, to a post-modification dataset version that causes the Protected Engine to be not vulnerable at all or less vulnerable to said particular attack; by generating and adding Adversarial Data to said Protected Dataset and by initiating re-training of the Protected Engine based on the post-modification dataset version.

In some embodiments, the Protected Engine utilizes a Protected Architecture having a particular number of pipeline operations that utilize particular values of operational parameters; wherein at least one of the Offline Protection Unit and the Online Protection Unit, automatically modifies said Protected Architecture, from a pre-modification architecture version that causes the Protected Engine to be vulnerable to a particular attack, to a post-modification architecture version that causes the Protected Engine to be not vulnerable at all or less vulnerable to said particular attack; by modifying a number or an order of said pipeline operations or by modifying one or more of said particular values of operational parameters.

In some embodiments, the Protected Engine utilizes a Protected Architecture having a particular number of pipeline operations that utilize particular values of operational parameters; wherein at least one of the Offline Protection Unit and the Online Protection Unit, automatically modifies said Protected Architecture, from a pre-modification architecture version that causes the Protected Engine to be vulnerable to a particular attack, to a post-modification architecture version that causes the Protected Engine to be not vulnerable at all or less vulnerable to said particular attack; by adding to said Protected Architecture a pre-processing unit that performs an additional operation on inputs received by the Protected Engine.

In some embodiments, the Protected Engine utilizes a Protected Architecture having a particular number of pipeline operations that utilize particular values of operational parameters; wherein at least one of the Offline Protection Unit and the Online Protection Unit, automatically modifies said Protected Architecture, from a pre-modification architecture version that causes the Protected Engine to be vulnerable to a particular attack, to a post-modification architecture version that causes the Protected Engine to be not vulnerable at all or less vulnerable to said particular attack; by adding to said Protected Architecture a post-processing unit that performs an additional operation on outputs generated by the Protected Engine prior to transferring said outputs to an intended recipient.

In some embodiments, the Protected Engine utilizes a Protected Architecture having a particular number of pipeline operations that utilize particular values of operational parameters; wherein at least one of the Offline Protection Unit and the Online Protection Unit, automatically modifies said Protected Architecture, from a pre-modification architecture version that causes the Protected Engine to be vulnerable to a particular attack, to a post-modification architecture version that causes the Protected Engine to be not vulnerable at all or less vulnerable to said particular attack; by adding to a pipeline of the Protected Architecture an attack detector unit that analyses inputs and determines whether a particular input or a particular group of inputs relate to an attack on the Protected Engine.

In some embodiments, the Attack Detector Unit is not necessarily an integral part of the protection array or the offline protection unit or the online protection unit; but rather, it may be an auxiliary unit that detects attacks or that estimates that a particular input (or set of inputs) may be part of an attack or may be malicious or non-legitimate; and may transfer an "attack detected/estimated" signal to other parts of units of the system in order to invoke protection operations and/or mitigation operations.

In some embodiments, one or more of the protection units of the platform or system, such as the Offline Protection Unit, may operate by actively modifying or adjusting an internal structure of the model (or, the digital representation of a model) on which the ML/DL/AI engine runs or operates; and/or by adding pre-processing and/or post-processing operations, filtering operations, sanitizing operations, re-training, adversarial training, and/or other techniques; and may perform operations that cause the ML/DL/AI engine and/or its model to be more resilient towards attacks or less vulnerable or more robust.

In some embodiments, the Protected Engine utilizes a Protected Architecture having a particular number of pipeline operations that utilize particular values of operational parameters; wherein at least one of the Offline Protection Unit and the Online Protection Unit, automatically modifies said Protected Architecture, by performing at least one of: (i) rate-limiting a number of queries that a particular recipient can submit to said Protected Engine, (ii) discarding at least some of incoming queries to said Protected Engine, (iii) quarantining at least some of incoming queries to said Protected Engine; (iv) intentionally delaying outputs, or a particular output, or particular subset of outputs, that are generated by the Protected Engine, prior to their delivery to the relevant or intended recipient(s); (v) alternating among two or more of the above-mentioned operations, or performing from time to time a different operation from the above-mentioned operations.

In some embodiments, the Protected Engine utilizes a Protected Architecture having a particular number of pipeline operations that utilize particular values of operational parameters; wherein at least one of the Offline Protection Unit and the Online Protection Unit, automatically modifies said Protected Architecture, by intentionally delaying responses that are outputted from said Protected Engine towards a particular recipient.

In some embodiments, the Protected Engine utilizes a Protected Architecture having a particular number of pipeline operations that utilize particular values of operational parameters; wherein at least one of the Offline Protection Unit and the Online Protection Unit, automatically modifies said Protected Architecture, by intentionally providing incorrect outputs from said Protected Engine towards a particular recipient that is determined to be an origin of malicious queries.

In some embodiments, at least one of the Offline Protection Unit and the Online Protection Unit, utilizes a Secondary Engine that is selected from the group consisting of: a secondary ML engine, a secondary DL engine, a secondary AI engine, to perform a secondary classification of an input query that is received from a particular originating entity; and based on a classification of said input query performed by the Secondary Engine, to determine whether or not said input query is part of a malicious attack on the Protected Engine.

In some embodiments, the system further comprises an AI-based Pen-Testing Unit (or ML-based or DL-based Pen-Testing Unit), configured to perform, in a controlled manner, automated penetration tests against said Protected Engine; and configured to estimate or to predict (e.g., via ML/DL/AI techniques) a quantitative level of resilience of said Protected Engines against various types of attacks. In some embodiments, every penetration test that is performed against the Protected Engine, adds a new data-sample or data-point that is then utilized by the AI-based (or ML-based or DL-based) Pen-Test Unit to re-train and thus improve the pen-testing prediction model(s). In some embodiments, the AI-based (or ML-based, or DL-based) pen-testing unit may predict or estimate the most effective attacks or attack-types that can be used against the Protected Engine, and/or may predict or estimate the hyper-parameters of such attack or the most effective way that such attack can be carried out against the Protected Engine; and the ML-predicted hyper-parameters of the ML-predicted attack against the Protected Engine may be used by the protection platform in order to invoke or apply or select the relevant or the effective protection operations or mitigation operations (e.g., via ML-based/AI-based/DL-based prediction or selection; or by a deterministic selection process that is based on a set of pre-defined selection rules).

Similarly, the Offline protection unit and/or the Online protection unit may be AI-based or ML-based on DL-based, and therefore they may be continuously (or periodically) re-trained based on the ongoing monitored performance of the Protected Engine and/or the protection platform, thus learning and improving autonomously.

In some embodiments, the system comprises a Defense Policy Constructor Unit, configured to construct a user-configurable Defense Policy that is defined by a plurality of user-configurable operational constraints of the Protected Engine, and configured to dynamically select and invoke and enforce a particular Protection Scheme, from a pool of multiple available Protection Schemes, that protects the Protected Engine against attacks while also complying with the user-configurable operational constraints.

In some embodiments, the system comprises: an Attack Mitigation Unit, configured to select and to activate one or more deterministic and non-A.I.-based mitigation techniques, in response to a determination that the Protected Engine is being attacked.

In some embodiments, the system comprises an Attack Mitigation Unit, configured to select and to activate one or more A.I.-based non-deterministic mitigation techniques, in response to a determination that the Protected Engine is being attacked.

In some embodiments, the system comprises: a Non-Intrusive Defense Unit, configured to perform pre-processing operations and/or post-processing operations that block a detected attack against the Protective Engine, without modifying a model that is utilized by the Protected Engine, and without re-training the Protected Engine on a modified dataset, and without having access to an internal pipeline of operations that is performed by the Protected Engine.

In some embodiments, the Protected Engine is protected against malicious queries and malicious inputs by said system which is a remote, cloud-computing based system that is remote from said Protected Engine and is not co-located with said Protected Engine.

In some embodiments, the system comprises: a Defense Policy Construction Unit, to enable a user to input (i) defense goals for protecting the Protected Engine, and also (ii) operational constraints that the Protected Engine and/or the system should comply with; and a Defense Optimization Unit, that operates based on said defense goals and said operational constraints as provide by said user, and that is configured to dynamically select and apply a particular set of defense techniques to prevent or to mitigate attacks against the Protected Engine.

In some embodiments, the Defense Optimization Unit operates based on AI-based estimation or AI-based prediction of effective defense techniques that should be selected and applied for protecting said Protected Engine, based on AI-based analysis of historic data of protecting a plurality of different AI engines and/or ML engines and/or DL engines.

In some embodiments, the Protected Engine is one protected engine within a combination or a cascade or a pipeline of two or more AI or ML or DL engines; wherein the system performs protection operations to protect at least a portion of said combination or cascade or pipeline.

In some embodiments, the Online Protection Unit is configured to introduce and to invoke a Pre-Processing module that performs defensive pre-processing of input signals that are directed towards said Protected Engine.

In some embodiments, the Online Protection Unit is configured to introduce and to invoke a Post-Processing module that performs defensive post-processing of output signals that are generated and outputted by said Protected Engine prior to their delivery to intended recipients.

In some embodiments, the Online Protection Unit is configured to modify an operational architecture of said Protected Engine, from (I) a stand-alone or independent Protected Engine, to (II) a Protected Engine that is part of a multi-engine pipeline or multi-engine cascade structure that is more resilient to attacks relative to the stand-alone or independent Protected Engine.

In some embodiments, the system comprises a weak spot detector, that is configured: (A) to cluster an original dataset into at least a first cluster and a second cluster, wherein the first cluster has data-items of the original dataset that share a first common characteristic, wherein the second cluster has data-items of the original dataset that share a second common characteristic; and (B) to compare between (I) a first performance accuracy of the Protect Engine towards data-items of the first cluster, with (II) a second performance accuracy of the Protect Engine towards data-items of the second cluster; and (C) based on analysis that takes into account (c1) characteristics of the first cluster, and (c2) characteristics of the second cluster, and (c3) the first performance accuracy, and (c4) the second performance characteristic, determining a weak spot of the Protected Engine in which the Protected Engine performs inaccurately towards a particular type of input data-items having a particular characteristic.

In some embodiments, the system comprises a Semantic Attack detector, configured to detect an attack that adds corrupting inputs to legitimate inputs that are provided to the Protected Engine.

In some embodiments, the system comprises a Physical Real-World Attach detector, configured to detect an attack that makes a real-world non-digital modification to a real-world object or to a real-world environment in order to defraud or confuse the Protected Engine.

In some embodiments, the system comprises an AI-based Attack Unit, configured: (I) to automatically analyze and research at least (i) operational characteristics of the Protected Engine, and (ii) publicly-available information about attacks against AI engines; and (II) to generate a textual output in a natural language, that indicates a novel method to attack the Protected Engine.

In some embodiments, the system comprises: an AI-based Attack Unit, configured (I) to analyze and research at least (i) operational characteristics of the Protected Engine, and (ii) publicly-available information about attacks against AI engines; and (II) to generate a textual output in a programming language, that is capable of performing a novel attack against the Protected Engine.

In some embodiments, the system comprises an AI-based Brainstormer Unit, which comprises at least: (i) a first Large Language Model (LLM) that is configured to generate output that focuses on a first performance aspect of the Protected Engine; (ii) a second Large Language Model (LLM) that is configured to generate output that focuses on a second, different, performance aspect of the Protected Engine; (iii) a chat coordination unit, to coordinate an automatic chat between the first LLM and the second LLM, and to extract from said automatic chat at least one insight that improves performance of the Protected Engine.

In some embodiments, the system comprises an AI-based Brainstormer Unit, which comprises at least: (i) a plurality of Large Language Model (LLM) units, wherein each LLM unit is configured to generate output that focuses on a different performance aspect of the Protected Engine; (ii) a Moderator LLM, that is configured to allocate chat slots among the plurality of LLM units, and to determine what portion of chat history is accessible to each of the LLM units; and to extract from an automatic chat of said plurality of LLM units at least one insight that improves performance of the Protected Engine.

Some embodiments may include a non-transitory storage medium or storage article having stored thereon instructions or code that, when executed by a machine or a hardware processor, cause such machine or hardware processor to perform a method as described.

Some implementations may utilize an automated method or automated process, or a machine-implemented method or process, or as a semi-automated or partially-automated method or process, or as a set of steps or operations which may be executed or performed by a computer or machine or system or other device.

Some embodiments may be implemented using suitable hardware components and/or software components; a processor able to execute code or programs or machine-readable instructions (e.g., a Central Processing Unit (CPU), a Digital Signal Processor (DSP), an Integrated Circuit (IC), a logic unit, or the like); a storage unit to store received data and/or processed data (e.g., hard disk drive, solid state drive); a memory unit to store data for short term (e.g., Random Access Memory (RAM) memory, Flash memory); a transceiver able to send and receive data using one or more wireless communication protocols (e.g., Wi-Fi communication, cellular communication, TCP/IP communication); and other suitable components (e.g., input unit such as keyboard and mouse; output unit such as display unit; power source; or the like).

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "generating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some implementations may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some implementations may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some implementations may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
one or more processors that are configured to execute code,
wherein the one or more processors are operably associated with one or more memory units that are configured to store code;
wherein the system is configured to protect a Protected Engine that is a unit selected from the group consisting of: a Machine Learning (ML) unit, a Deep Learning (DL) unit, an Artificial Intelligence (AI) unit, a Neural Network (NN) unit, a Large Language Model (LLM) unit;
wherein the system is configured to protect the Protected Engine against malicious inputs and malicious queries and malicious training data and malicious attacks;
wherein the system comprises at least one of:
(a) an Offline Protection Unit, to analyze one or more characteristics of the Protected Engine, and to perform offline fortification of said Protected Engine against attacks by changing one or more operational properties or operational parameters of the Protected Engine and to reduce its vulnerability to attacks;
(b) an Online Protection Unit, to perform analysis of at least one of: (i) one or more inputs that are directed to be inputs of the Protected Engine, (ii) one or more outputs that are generated by the Protected Engine; and based on said analysis, to dynamically perform online fortification of said Protected Engine against attacks by dynamically changing one or more operational properties or operational parameters of the Protected Engine and to reduce its vulnerability to-attacks;
wherein the Protected Engine utilizes a Protected Architecture having a particular number of pipeline operations that utilize particular values of operational parameters;
wherein at least one of the Offline Protection Unit and the Online Protection Unit,
automatically modifies said Protected Architecture,
by intentionally providing incorrect outputs from said Protected Engine towards a particular recipient that is determined to be an origin of malicious queries.

2. The system of claim 1,
further comprising a Defense Policy Constructor Unit,
configured to construct a user-configurable Defense Policy that is defined by a plurality of user-configurable operational constraints of the Protected Engine,
and configured to dynamically select and invoke and enforce a particular Protection Scheme, from a pool of multiple available Protection Schemes, that protects the Protected Engine against attacks while also complying with the user-configurable operational constraints.

3. The system of claim 1,
further comprising a Defense Policy Construction Unit, to enable a user to input (i) defense goals for protecting the Protected Engine, and also (ii) operational constraints that the Protected Engine and/or the system should comply with;
a Defense Optimization Unit, that operates based on said defense goals and said operational constraints as provide by said user, and that is configured to dynamically select and apply a particular set of defense techniques to prevent or to mitigate attacks against the Protected Engine.

4. The system of claim 3,
wherein the Defense Optimization Unit operates based on AI-based estimation or AI-based prediction of effective defense techniques that should be selected and applied for protecting said Protected Engine, based on AI-based analysis of historic data of protecting a plurality of different AI engines and/or ML engines and/or DL engines.

5. The system of claim 1, further comprising:
a Semantic Attack detector, configured to detect an attack that adds corrupting inputs to legitimate inputs that are provided to the Protected Engine.

6. The system of claim 1, further comprising:
an AI-based Attack Unit, configured
(I) to research at least (i) operational characteristics of the Protected Engine, and (ii) publicly-available information about attacks against AI engines, and
(II) to generate a textual output in a programming language, that is capable of performing a novel attack against the Protected Engine.

7. A system comprising:
one or more processors that are configured to execute code,
wherein the one or more processors are operably associated with one or more memory units that are configured to store code;
wherein the system is configured to protect a Protected Engine that is a unit selected from the group consisting of: a Machine Learning (ML) unit, a Deep Learning (DL) unit, an Artificial Intelligence (AI) unit, a Neural Network (NN) unit, a Large Language Model (LLM) unit;
wherein the system is configured to protect the Protected Engine against malicious inputs and malicious queries and malicious training data and malicious attacks;
wherein the system comprises at least one of:
(a) an Offline Protection Unit, to analyze one or more characteristics of the Protected Engine, and to perform offline fortification of said Protected Engine against attacks by changing one or more operational properties or operational parameters of the Protected Engine and to reduce its vulnerability to attacks;
(b) an Online Protection Unit, to perform analysis of at least one of: (i) one or more inputs that are directed to be inputs of the Protected Engine, (ii) one or more outputs that are generated by the Protected Engine; and based on said analysis, to dynamically perform online fortification of said Protected Engine against attacks by dynamically changing one or more operational properties or operational parameters of the Protected Engine and to reduce its vulnerability to-attacks;
wherein at least one of the Offline Protection Unit and the Online Protection Unit,
utilizes a Secondary Engine that is selected from the group consisting of: a secondary ML engine, a secondary DL engine, a secondary AI engine,
to perform a secondary classification of an input query that is received from a particular originating entity;
and based on a classification of said input query performed by the Secondary Engine,
to determine whether or not said input query is part of a malicious attack on the Protected Engine.

8. The system of claim 7,
wherein the Protected Engine utilizes a Protected Model that is selected from the group consisting of: a ML model, a DL model, an AI model, a Large Language Model (LLM);
wherein at least one of the Offline Protection Unit and the Online Protection Unit, automatically modifies said Protected Model, from a pre-modification model version that is vulnerable to a particular attack, to a post-modification model version that is not vulnerable at all or that is less vulnerable to said particular attack.

9. The system of claim 7,
wherein the Protected Engine operates based on a Protected Dataset;
wherein at least one of the Offline Protection Unit and the Online Protection Unit, automatically modifies said Protected Dataset, from a pre-modification dataset version that causes the Protected Engine to be vulnerable to a particular attack, to a post-modification dataset version that causes the Protected Engine to be not vulnerable at all or less vulnerable to said particular attack.

10. The system of system of claim 7,
wherein the Protected Engine operates based on a Protected Dataset;
wherein at least one of the Offline Protection Unit and the Online Protection Unit,
automatically modifies said Protected Dataset, from a pre-modification dataset version that causes the Protected Engine to be vulnerable to a particular attack, to a post-modification dataset version that causes the Protected Engine to be not vulnerable at all or less vulnerable to said particular attack,
by generating and adding Adversarial Data to said Protected Dataset and by initiating re-training of the Protected Engine based on the post-modification dataset version.

11. The system of claim 7,
wherein the Protected Engine utilizes a Protected Architecture having a particular number of pipeline operations that utilize particular values of operational parameters;
wherein at least one of the Offline Protection Unit and the Online Protection Unit,
automatically modifies said Protected Architecture,
from a pre-modification architecture version that causes the Protected Engine to be vulnerable to a particular attack, to a post-modification architecture version that causes the Protected Engine to be not vulnerable at all or less vulnerable to said particular attack,
by modifying a number or an order of said pipeline operations or by modifying one or more of said particular values of operational parameters.

12. The system of claim 7,
wherein the Protected Engine utilizes a Protected Architecture having a particular number of pipeline operations that utilize particular values of operational parameters;
wherein at least one of the Offline Protection Unit and the Online Protection Unit,
automatically modifies said Protected Architecture,
from a pre-modification architecture version that causes the Protected Engine to be vulnerable to a particular attack, to a post-modification architecture version that causes the Protected Engine to be not vulnerable at all or less vulnerable to said particular attack,
by adding to said Protected Architecture a pre-processing unit that performs an additional operation on inputs received by the Protected Engine.

13. The system of claim 7,
wherein the Protected Engine utilizes a Protected Architecture having a particular number of pipeline operations that utilize particular values of operational parameters;
wherein at least one of the Offline Protection Unit and the Online Protection Unit,
automatically modifies said Protected Architecture,
from a pre-modification architecture version that causes the Protected Engine to be vulnerable to a particular attack, to a post-modification architecture version that causes the Protected Engine to be not vulnerable at all or less vulnerable to said particular attack,
by adding to said Protected Architecture a post-processing unit that performs an additional operation on outputs generated by the Protected Engine prior to transferring said outputs to an intended recipient.

14. The system of claim 7,
wherein the Protected Engine utilizes a Protected Architecture having a particular number of pipeline operations that utilize particular values of operational parameters;
wherein at least one of the Offline Protection Unit and the Online Protection Unit,
automatically modifies said Protected Architecture,
from a pre-modification architecture version that causes the Protected Engine to be vulnerable to a particular attack, to a post-modification architecture version that causes the Protected Engine to be not vulnerable at all or less vulnerable to said particular attack,
by adding to a pipeline of the Protected Architecture an attack detector unit that analyses inputs and determines whether a particular input or a particular group of inputs relate to an attack on the Protected Engine.

15. The system of claim 7,
wherein the Protected Engine utilizes a Protected Architecture having a particular number of pipeline operations that utilize particular values of operational parameters;
wherein at least one of the Offline Protection Unit and the Online Protection Unit,
automatically modifies said Protected Architecture,
by performing at least one of:
(i) rate-limiting a number of queries that a particular recipient can submit to said Protected Engine,
(ii) discarding at least some of incoming queries to said Protected Engine,
(iii) quarantining at least some of incoming queries to said Protected Engine.

16. The system of claim 7,
wherein the Protected Engine utilizes a Protected Architecture having a particular number of pipeline operations that utilize particular values of operational parameters;
wherein at least one of the Offline Protection Unit and the Online Protection Unit,
automatically modifies said Protected Architecture,
by intentionally delaying responses that are outputted from said Protected Engine towards a particular recipient.

17. The system of claim 7,
further comprising an AI-based Pen-Testing Unit,
configured to perform, in a controlled manner, automated penetration tests against said Protected Engine,
and configured to estimate a quantitative level of resilience of said Protected Engines against various types of attacks.

18. The system of claim 7, comprising:
an Attack Mitigation Unit, configured to select and to activate one or more deterministic and non-A.I.-based mitigation techniques, in response to a determination that the Protected Engine is being attacked.

19. The system of claim 7, further comprising:
a Physical Real-World Attach detector, configured to detect an attack that makes a real-world non-digital modification to a real-world object or to a real-world environment in order to defraud or confuse the Protected Engine.

20. The system of claim 7, further comprising:
an AI-based Attack Unit, configured
(I) to research at least (i) operational characteristics of the Protected Engine, and (ii) publicly-available information about attacks against AI engines, and
(II) to generate a textual output in a natural language, that indicates a novel method to attack the Protected Engine.

21. A system comprising:
one or more processors that are configured to execute code,
wherein the one or more processors are operably associated with one or more memory units that are configured to store code;
wherein the system is configured to protect a Protected Engine that is a unit selected from the group consisting of: a Machine Learning (ML) unit, a Deep Learning (DL) unit, an Artificial Intelligence (AI) unit, a Neural Network (NN) unit, a Large Language Model (LLM) unit;
wherein the system is configured to protect the Protected Engine against malicious inputs and malicious queries and malicious training data and malicious attacks;
wherein the system comprises at least one of:
(a) an Offline Protection Unit, to analyze one or more characteristics of the Protected Engine, and to perform offline fortification of said Protected Engine against attacks by changing one or more operational properties or operational parameters of the Protected Engine and to reduce its vulnerability to attacks;
(b) an Online Protection Unit, to perform analysis of at least one of: (i) one or more inputs that are directed to be inputs of the Protected Engine, (ii) one or more outputs that are generated by the Protected Engine; and based on said analysis, to dynamically perform online fortification of said Protected Engine against attacks by dynamically changing one or more operational properties or operational parameters of the Protected Engine and to reduce its vulnerability to, attacks;
wherein the Online Protection Unit is configured to modify an operational architecture of said Protected Engine, from being a stand-alone or independent Protected Engine, to being a Protected Engine that is part of a multi-engine pipeline or multi-engine cascade structure that is more resilient to attacks relative to the stand-alone or independent Protected Engine.

22. The system of claim 21, comprising:
an Attack Mitigation Unit,
configured to select and to activate one or more AI-based non-deterministic mitigation techniques, in response to a determination that the Protected Engine is being attacked.

23. The system of claim 21,
wherein the Protected Engine is protected against malicious queries and malicious inputs by said system which is a remote, cloud-computing based system that is remote from said Protected Engine and is not co-located with said Protected Engine.

24. The system of claim 21,
wherein the Online Protection Unit is configured to introduce and to invoke a Pre-Processing module that performs defensive pre-processing of input signals that are directed towards said Protected Engine.

25. A system comprising:
one or more processors that are configured to execute code,
wherein the one or more processors are operably associated with one or more memory units that are configured to store code;
wherein the system is configured to protect a Protected Engine that is a unit selected from the group consisting of: a Machine Learning (ML) unit, a Deep Learning (DL) unit, an Artificial Intelligence (AI) unit, a Neural Network (NN) unit, a Large Language Model (LLM) unit;
wherein the system is configured to protect the Protected Engine against malicious inputs and malicious queries and malicious training data and malicious attacks;
wherein the system comprises at least one of:
(a) an Offline Protection Unit, to analyze one or more characteristics of the Protected Engine, and to perform offline fortification of said Protected Engine against attacks by changing one or more operational properties or operational parameters of the Protected Engine and to reduce its vulnerability to attacks;
(b) an Online Protection Unit, to perform analysis of at least one of: (i) one or more inputs that are directed to be inputs of the Protected Engine, (ii) one or more outputs that are generated by the Protected Engine; and based on said analysis, to dynamically perform online fortification of said Protected Engine against attacks by dynamically changing one or more operational properties or operational parameters of the Protected Engine and to reduce its vulnerability to, attacks;
wherein the system comprises:
a weak spot detector, configured
(A) to cluster an original dataset into at least a first cluster and a second cluster, wherein the first cluster has data-items of the original dataset that share a first common characteristic, wherein the second cluster has data-items of the original dataset that share a second common characteristic; and
(B) to compare between (I) a first performance accuracy of the Protect Engine towards data-items of the first cluster, with (II) a second performance accuracy of the Protect Engine towards data-items of the second cluster; and
(C) based on analysis that takes into account (c1) characteristics of the first cluster, and (c2) characteristics of the second cluster, and (c3) the first performance accuracy, and (c4) the second performance characteristic, determining a weak spot of the Protected Engine in which the Protected Engine performs inaccurately towards a particular type of input data-items having a particular characteristic.

26. The system of claim 25, comprising:
a Non-Intrusive Defense Unit, configured to perform pre-processing operations and/or post-processing operations that block a detected attack against the Protective Engine, without modifying a model that is utilized by the Protected Engine, and without re-training the Protected Engine on a modified dataset, and without having access to an internal pipeline of operations that is performed by the Protected Engine.

27. The system of claim 25,
wherein the Protected Engine is one protected engine within a combination or a cascade or a pipeline of two or more AI or ML or DL engines;

wherein the system performs protection operations to protect at least a portion of said combination or cascade or pipeline.

28. The system of claim 25,
wherein the Online Protection Unit is configured to introduce and to invoke a Post-Processing module that performs defensive post-processing of output signals that are generated and outputted by said Protected Engine prior to their delivery to intended recipients.

29. A system comprising:
one or more processors that are configured to execute code,
wherein the one or more processors are operably associated with one or more memory units that are configured to store code;
wherein the system is configured to protect a Protected Engine that is a unit selected from the group consisting of: a Machine Learning (ML) unit, a Deep Learning (DL) unit, an Artificial Intelligence (AI) unit, a Neural Network (NN) unit, a Large Language Model (LLM) unit;
wherein the system is configured to protect the Protected Engine against malicious inputs and malicious queries and malicious training data and malicious attacks;
wherein the system comprises at least one of:
(a) an Offline Protection Unit, to analyze one or more characteristics of the Protected Engine, and to perform offline fortification of said Protected Engine against attacks by changing one or more operational properties or operational parameters of the Protected Engine and to reduce its vulnerability to attacks;
(b) an Online Protection Unit, to perform analysis of at least one of: (i) one or more inputs that are directed to be inputs of the Protected Engine, (ii) one or more outputs that are generated by the Protected Engine; and based on said analysis, to dynamically perform online fortification of said Protected Engine against attacks by dynamically changing one or more operational properties or operational parameters of the Protected Engine and to reduce its vulnerability to-attacks;
wherein the system comprises:
an AI-based Brainstormer Unit, which comprises at least:
(i) a first Large Language Model (LLM) that is configured to generate output that focuses on a first performance aspect of the Protected Engine;
(ii) a second Large Language Model (LLM) that is configured to generate output that focuses on a second, different, performance aspect of the Protected Engine;
(iii) a chat coordination unit, to coordinate an automatic chat between the first LLM and the second LLM, and to extract from said automatic chat at least one insight that improves performance of the Protected Engine.

30. A system comprising:
one or more processors that are configured to execute code,
wherein the one or more processors are operably associated with one or more memory units that are configured to store code;
wherein the system is configured to protect a Protected Engine that is a unit selected from the group consisting of: a Machine Learning (ML) unit, a Deep Learning (DL) unit, an Artificial Intelligence (AI) unit, a Neural Network (NN) unit, a Large Language Model (LLM) unit;
wherein the system is configured to protect the Protected Engine against malicious inputs and malicious queries and malicious training data and malicious attacks;
wherein the system comprises at least one of:
(a) an Offline Protection Unit, to analyze one or more characteristics of the Protected Engine, and to perform offline fortification of said Protected Engine against attacks by changing one or more operational properties or operational parameters of the Protected Engine and to reduce its vulnerability to attacks;
(b) an Online Protection Unit, to perform analysis of at least one of: (i) one or more inputs that are directed to be inputs of the Protected Engine, (ii) one or more outputs that are generated by the Protected Engine; and based on said analysis, to dynamically perform online fortification of said Protected Engine against attacks by dynamically changing one or more operational properties or operational parameters of the Protected Engine and to reduce its vulnerability to-attacks;
wherein the system comprises:
an AI-based Brainstormer Unit, which comprises at least:
(i) a plurality of Large Language Model (LLM) units, wherein each LLM unit is configured to generate output that focuses on a different performance aspect of the Protected Engine;
(ii) a Moderator LLM, that is configured to allocate chat slots among the plurality of LLM units, and to determine what portion of chat history is accessible to each of the LLM units; and to extract from an automatic chat of said plurality of LLM units at least one insight that improves performance of the Protected Engine.

* * * * *